(12) United States Patent
McLaren et al.

(10) Patent No.: US 10,347,993 B2
(45) Date of Patent: Jul. 9, 2019

(54) SYSTEM AND METHOD FOR INSTALLING AN ANTENNA MODULE IN A GATEWAY ANTENNA

(71) Applicant: Hughes Network Systems LLC, Germantown, MD (US)

(72) Inventors: Peter McLaren, Bowie, MD (US); Kumud Patel, Clarksburg, MD (US)

(73) Assignee: HUGHES NETWORK SYSTEMS, LLC, Germantown, MD (US)

(*) Notice: Subject to any disclaimer, the term of this patent is extended or adjusted under 35 U.S.C. 154(b) by 0 days.

(21) Appl. No.: 15/690,557

(22) Filed: Aug. 30, 2017

(65) Prior Publication Data
US 2019/0067828 A1 Feb. 28, 2019

(51) Int. Cl.
*H01Q 19/12* (2006.01)
*H01Q 15/14* (2006.01)
*H01Q 1/12* (2006.01)
*H01Q 15/16* (2006.01)
H04B 7/185 (2006.01)

(52) U.S. Cl.
CPC ......... *H01Q 15/141* (2013.01); *H01Q 1/1207* (2013.01); *H01Q 15/16* (2013.01); *H04B 7/18517* (2013.01)

(58) Field of Classification Search
CPC .... H01Q 15/141; H01Q 1/1207; H01Q 15/16; H04B 7/18517
USPC .......... 343/840, 880, 765, 713, 779
See application file for complete search history.

(56) References Cited

U.S. PATENT DOCUMENTS

| | | | |
|---|---|---|---|
| 6,727,861 B2* | 4/2004 | Antoine | H01Q 1/12 248/237 |
| 2002/0005816 A1* | 1/2002 | Ginther | H01Q 1/1207 343/880 |
| 2008/0136722 A1* | 6/2008 | King | H01Q 1/1257 343/765 |
| 2009/0295654 A1* | 12/2009 | Baker | H01Q 1/125 343/713 |
| 2010/0013727 A1* | 1/2010 | Pifer | H01Q 1/125 343/779 |
| 2011/0215206 A1* | 9/2011 | Conrad | F16M 11/04 248/121 |
| 2013/0271320 A1* | 10/2013 | Trerise | H01Q 1/1257 342/359 |

(Continued)

*Primary Examiner* — Jean B Jeanglaude
(74) *Attorney, Agent, or Firm* — Global IP Counselors, LLP

(57) ABSTRACT

An antenna module installation system comprising a baseplate and a carrier chassis. The baseplate is configured to couple to an antenna dish assembly, and comprises an antenna module mounting apparatus including an alignment portion and a retention portion. The carrier chassis is configured to retain an antenna module, such as antenna hub amplifier, and comprises an engaging apparatus. The carrier chassis is configured to allow multiple manufacturers versions of a component to be used through adapter components. The engaging apparatus is configured to engage with the alignment portion, which positions the carrier chassis in a mounting alignment, and to move from the alignment portion to the retention portion which retains the carrier chassis in engagement with the baseplate. The engaging apparatus is designed to allow that direct connections to the component in the carrier chassis are disconnected prior to its removal.

20 Claims, 40 Drawing Sheets

(56) References Cited

U.S. PATENT DOCUMENTS

2016/0336640 A1* 11/2016 Bailey .................... H01Q 1/125

* cited by examiner

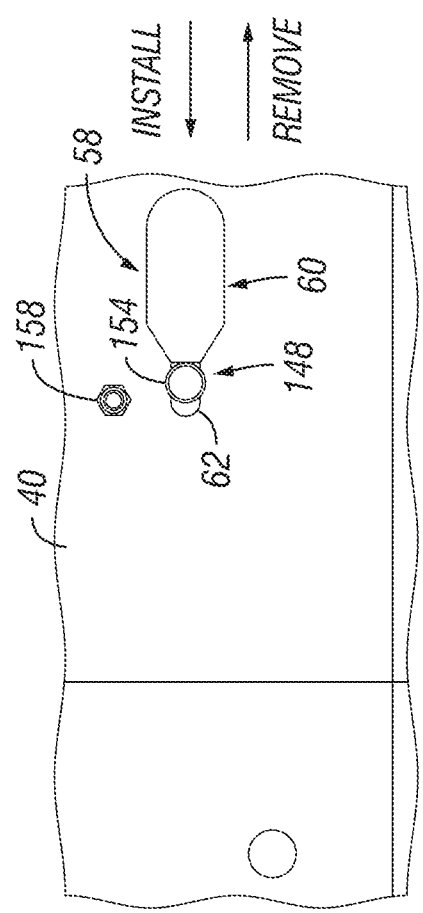

SYSTEM AND METHOD FOR INSTALLING AN ANTENNA MODULE IN A GATEWAY ANTENNA

BACKGROUND

Field of the Invention

The present invention generally relates to a system and method for installing an antenna module, such as an antenna hub amplifier, in a gateway antenna of a satellite communication network. More particularly, the present invention relates to a system and method which supports and aligns an antenna module during installation in the gateway antenna.

Background Information

As understood in the art, satellite communication systems include a plurality of terrestrially mounted gateways that communicate with one or more orbiting satellites. Each satellite gateway includes an antenna dish assembly, which typically includes an antenna feed and other types of equipment such a transceiver, hub amplifiers, waveguides and so on which enable communication between the satellite gateway and one or more of the orbiting satellites. The satellite gateway and a satellite typically communicate with each other over a radio frequency link, such as a Ku-band link, a Ka-band link or any other suitable type of link. For example, the Ku-band is a portion of the electromagnetic spectrum in the microwave range of frequencies ranging from 10 GHz to 18 GHz, and the Ka band is a portion of the electromagnetic spectrum in the microwave range of frequencies ranging from 17 GHz to 40 GHz.

During initial installation of the antenna dish assembly, equipment such as the antenna dish, antenna feed, transceiver, hub amplifiers, waveguides and so on are usually mounted to the antenna dish assembly before the antenna dish assembly is mounted to the antenna dish assembly base. Some of the equipment such as the hub amplifier can be mounted after the dish assembly is mounted to the base. Typically, the antenna dish assembly base mounts the antenna dish assembly a considerable distance about the ground, such as six feet or more. Equipment such as the hub amplifiers are usually mounted to the antenna dish assembly by bolts so that such equipment can be replaced as necessary. During replacement of a hub amplifier, or at initial installation of the replaceable components, the antenna dish assembly remains mounted to the antenna dish assembly base, and the antenna dish itself is oriented as appropriate, for example, to point in a horizontal direction to allow for access by the technician from the side. However, equipment such as the hub amplifiers, in particular, are relatively heavy and can weigh in excess of fifty pounds. Therefore, it can be burdensome for a technician to securely hold the hub amplifier while loosening the bolts to remove the hub amplifier from the antenna dish assembly. It can be even more burdensome for a technician to hold the hub amplifier in place while tightening the bolts to secure the hub amplifier to the antenna dish assembly. Therefore, it is often necessary for two technicians to participate in the hub amplifier removal and installation process in the field.

SUMMARY

In view of these drawbacks of the state of the known technology, one aspect of the present invention provides an antenna module installation system and method employing a baseplate and a carrier chassis. The baseplate is configured to couple to an antenna dish assembly, and comprises an antenna module mounting apparatus including an alignment portion and a retention portion. The carrier chassis is configured to retain an antenna module, such as an antenna hub amplifier, and comprises an engaging apparatus. The engaging apparatus is configured to engage with the alignment portion, which positions the carrier chassis in a mounting alignment, and to move from the alignment portion to the retention portion which retains the carrier chassis in engagement with the baseplate. During the installation, the alignment features also protect items such as the waveguide so they do not need to be removed from the antenna assembly during initial or replacement. The engaged carrier chassis with its mounted component can then be initially secured by hand tightening its incorporated fastening system followed by final tightening with a tool. Thus, the installation and removal process is made easier and more efficient.

For example, during the removal process, the system and method enables a single technician to loosen the fastening members, such as the bolts, to uncouple the antenna module mounting apparatus from the antenna dish assembly while the retention portion of the engaging apparatus retains the antenna module mounting apparatus, and thus the antenna module, such as an antenna hub amplifier, with the baseplate of the antenna dish assembly. The technician can then move the antenna module mounting apparatus toward the alignment portion of the engaging apparatus so that the technician can remove the antenna module mounting apparatus, including the antenna module, from the baseplate. Likewise, during the installation process, the technician can engage the antenna module mounting apparatus, including the antenna module, with the alignment portion of the engaging apparatus, and move the antenna module mounting apparatus toward the retention portion of the engaging apparatus so that the retention portion retains the antenna module mounting apparatus, and thus the antenna module, with the baseplate of the antenna dish assembly. The technician's both hands are then free to tighten the fastening members, such as the bolts, to couple the antenna module mounting apparatus, and thus the antenna module, to the antenna dish assembly.

BRIEF DESCRIPTION OF THE DRAWINGS

Referring now to the attached drawings which form a part of this original disclosure:

FIG. 80 is an end view of the cross bar handle as taken along lines 80-80 in FIG. 79;

FIG. 81 is an end view of the cross bar handle as taken along lines 81-81 in FIG. 79;

FIG. 82 is a detailed bottom plan view of the antenna feed module mounting apparatus as indicated by FIG. 82 in FIG. 4, illustrating an engaging pin of the second BUC assembly engaged with the narrower retention portion of an elongated opening in the hub baseplate;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
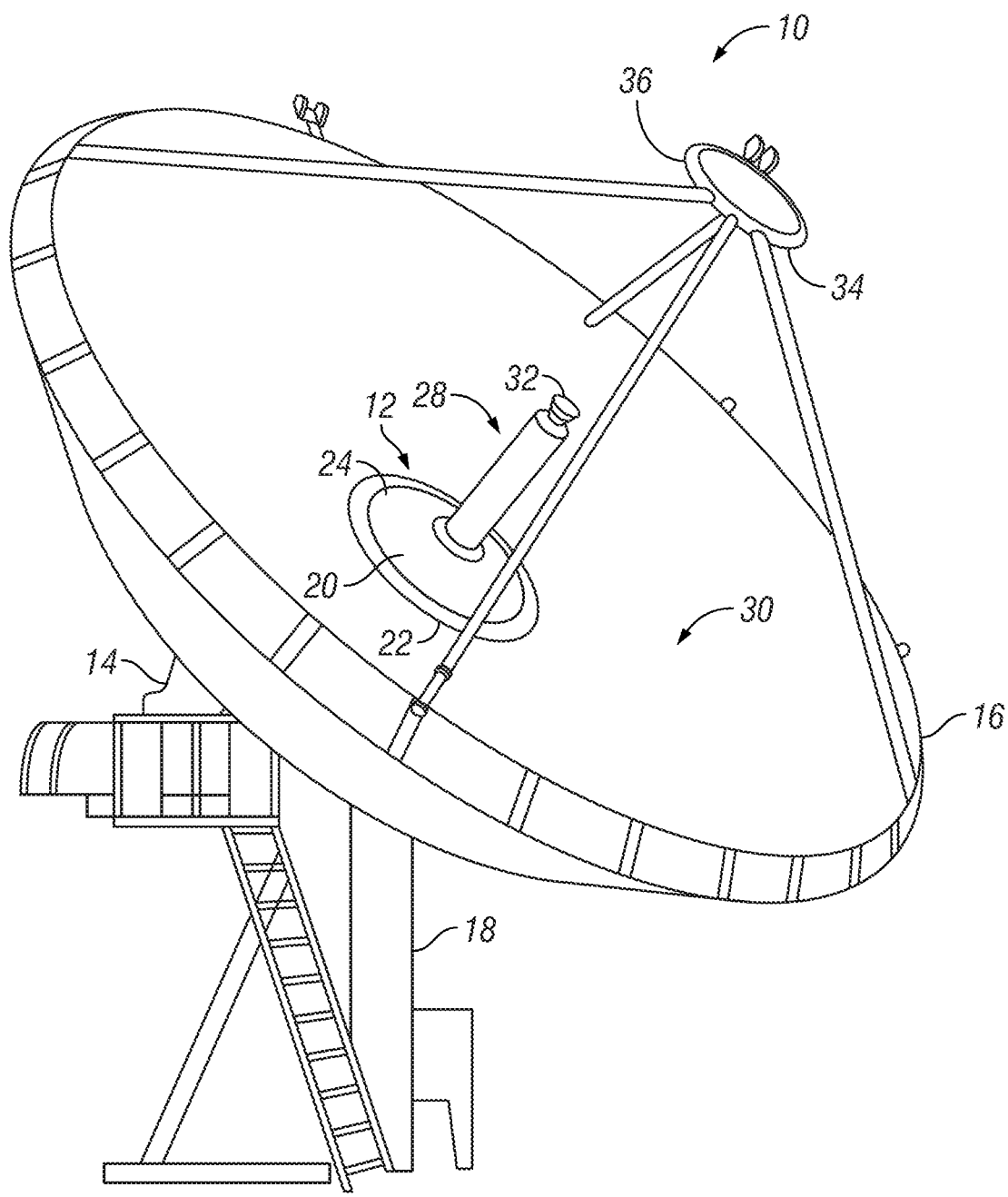
FIG. 1 illustrates an example of a satellite communication gateway including an antenna dish assembly employing an antenna module mounting apparatus according to a disclosed embodiment.

FIG. 1 illustrates an example of a gateway antenna 10 for use in a satellite communication network. The gateway antenna 10 is installed terrestrially at a desired location on the Earth, and includes an antenna system 12 and a gateway antenna equipment room 14. In this example, the antenna system 12 includes an antenna dish assembly 16 that is pivotally mounted to a terrestrially mounted antenna dish assembly base 18 in any conventional manner as understood in the art. Thus, the antenna dish assembly 16 can track or be manually or automatically pointed in azimuth and elevation to align the antenna dish assembly 16 with an antenna dish assembly of an orbiting satellite (not shown) in any conventional manner as understood in the art. However, although for exemplary purposes the embodiments disclosed herein are described with respectfully a terrestrially mounted antenna dish assembly, the embodiments can be employed in any suitable type of antenna dish assembly configuration, such as an antenna dish assembly configuration on a moving body.

The antenna system 12 according to a disclosed embodiment includes an antenna feed hub 20 that is configured to mount to the antenna dish assembly 16. In this example, the antenna feed hub 20 comprises a circumferential support 22 that is fixedly mount with respect to the antenna dish assembly 16 in any suitable manner. That is, the circumferential support 22 can be directly mounted to the antenna dish assembly 16 by any suitable type of fastening mechanisms such as bolts, welding and so on. Alternatively, the circumferential support 22 can be mounted to another type of support (not shown) so as to be positioned in a fixed manner with respect to the antenna dish assembly 16, and be capable of moving in unison with the antenna system 12, without necessarily being directly connected to the antenna dish assembly 16.

The antenna feed hub 20 further comprises a central support 24 that is mounted to the circumferential support 22 in any suitable manner as understood in the art. As further understood in the art, the central support 24 can be mounted in a stationary manner to the circumferential support 22, or can be rotatably mounted to the circumferential support 22 in any conventional manner. The central support 24 includes a surface 26. When the central support 24 is configured to rotate with respect to the circumferential support 22, the central support 24 can be rotated a full 360 degrees either clockwise or counter-clockwise as necessary, and is typically rotated up to 180 degrees in the clockwise or counter-clockwise directions.

As further illustrated, an antenna feed 28 is mounted to the central support 24 in any conventional manner. The antenna feed 28 can be, for example, a circularly polarized antenna feed, such as a Ka-band antenna feed. However, the antenna feed 28 can be any type of circularly polarized antenna feed, or any other type of antenna feed such as a Ku-band antenna feed or other type of commercial or military band antenna feed. The antenna feed 28 extends outward along its longitudinal axis with respect to the reflective surface 30 of the antenna dish assembly 16. As understood in the art, the antenna feed 28 can include a feed horn 32 that communicates with a subreflector 34 that is mounted to the antenna dish assembly 16 in any suitable manner as known in the art. Therefore, signals being emitted from the feed horn 32 reflect off of a reflective surface 36 of the subreflector 34 toward the reflective surface 30 of the antenna dish assembly 16, and then off of the reflective surface 30 toward the distant antenna dish assembly on, for example, an orbiting satellite (not shown) as understood in the art. Similarly, signals being emitted from, for example, the orbiting satellite toward the gateway antenna 10 are reflected off of the reflective surface 30 toward the reflective surface 36 of the subreflector 34, and are reflected off of the reflective surface 36 into the feed horn 32 as understood in the art. The antenna dish assembly 16, as well as the subreflector 36, can be round or substantially round, but as a practical matter can have an elliptical shape or other slightly out of round shape as understood in the art.

Figure 2:
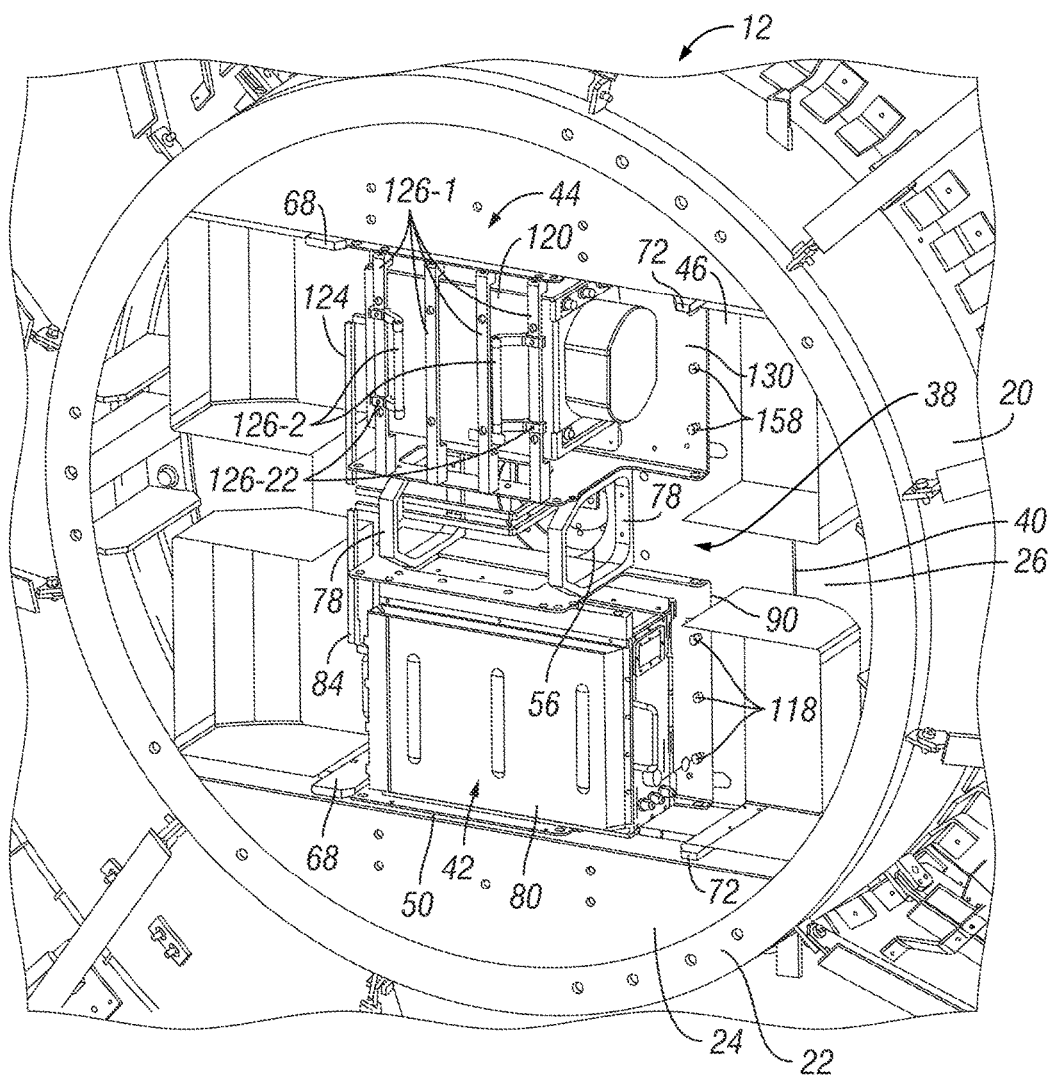
FIG. 2 is a perspective view illustrating an example of antenna module mounting apparatus attached to an antenna feed hub of the antenna dish assembly of the satellite communication gateway shown in FIG. 1, and having a first block upconverter (BUC) assembly and a second block upconverter (BUC) assembly mounted therein.
Figure 3:
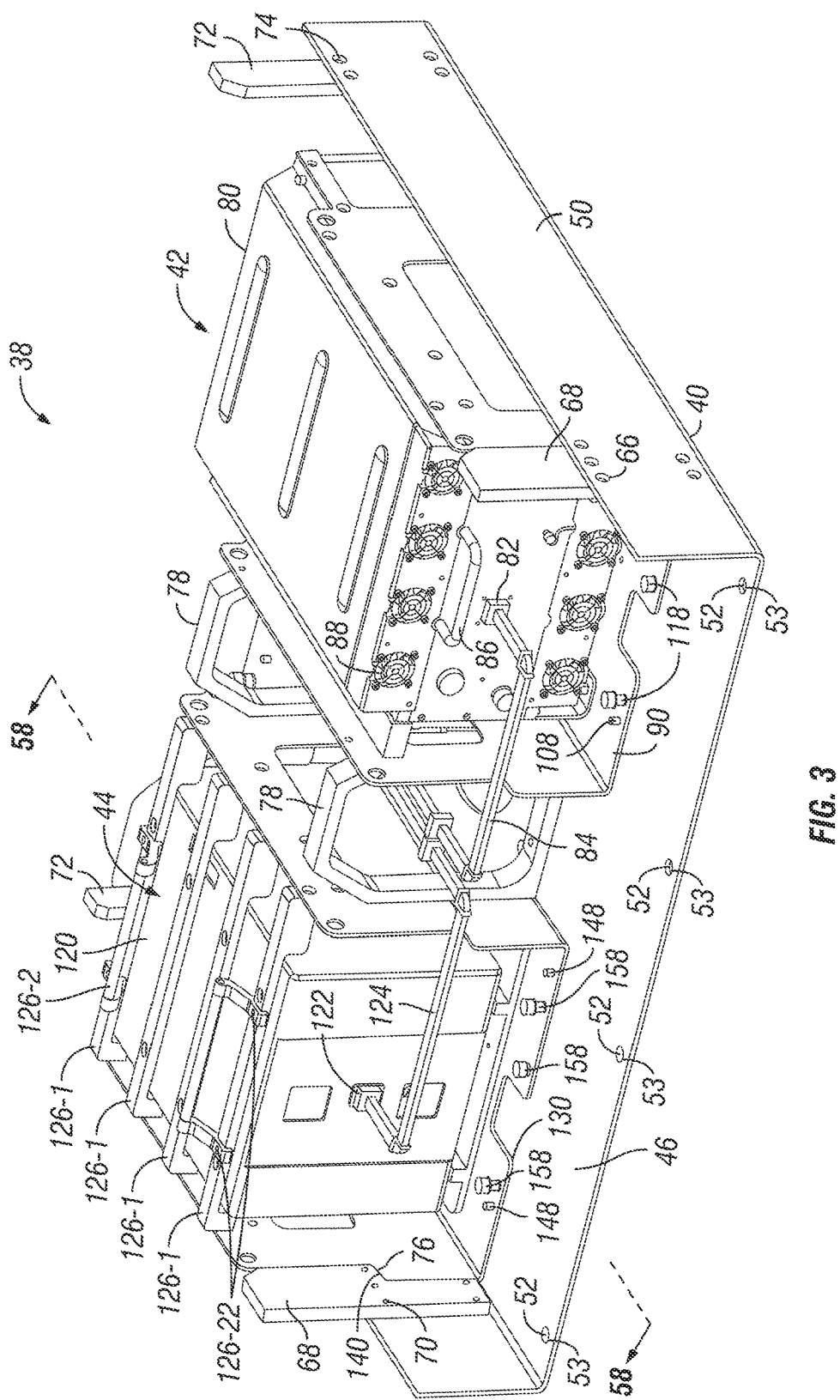
FIG. 3 is a top perspective view of the antenna module mounting apparatus shown in FIG. 2 separate from the antenna feed hub.
Figure 57:
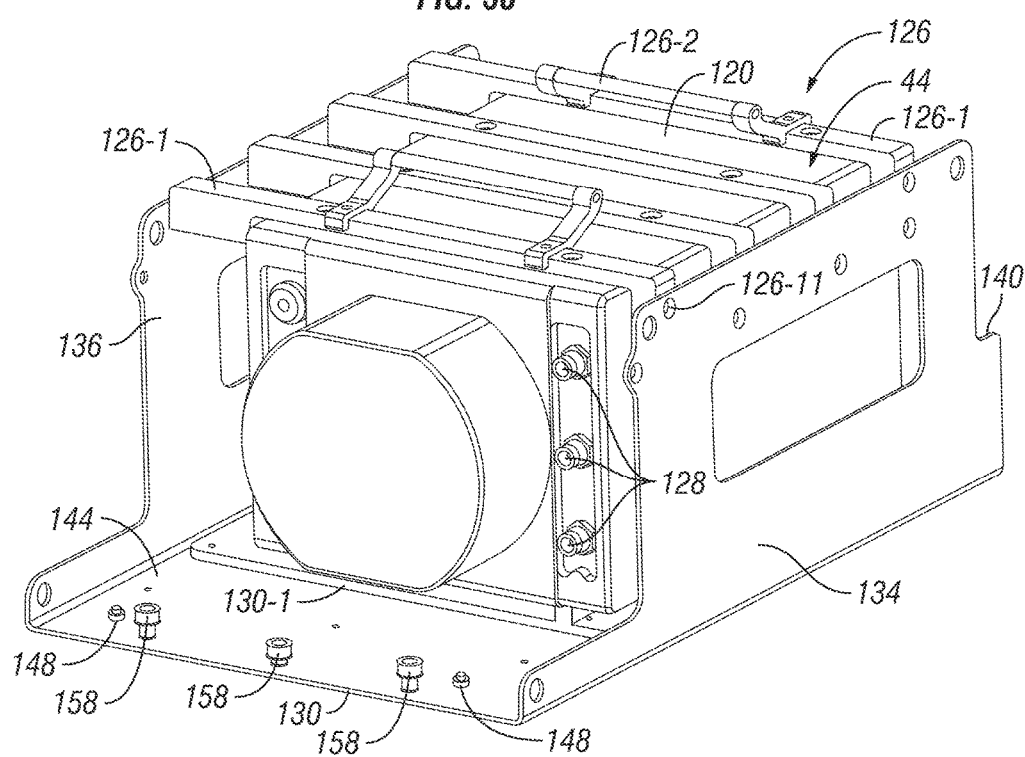
FIG. 57 is a rear perspective view of the second BUC assembly.

As further illustrated in FIGS. 2 through 57, the gateway antenna 10 includes an antenna module mounting system 38 for mounting antenna modules, such as hub amplifiers and other components, to the surface 26 of the central support 24. In this example, the antenna module mounting system 38 includes a hub baseplate 40 that is configured to mount a first block upconverter (BUC) assembly 42 and a second BUC assembly 44 to the central support 24. Each of the first and second BUC assemblies 42 and 44 can be referred to generally as an antenna module assembly or an antenna hub amplifier assembly for purposes of the description herein. It should also be noted that the first and second BUC assemblies 42 and 44 are interchangeable as can be understood in the art. The hub baseplate 40 can be made of any type of metal or any other suitable type of material as understood in the art. The hub baseplate 40 includes a base 46, a first wall 48 extending perpendicularly or substantially perpendicularly from one edge of the base 46, and a second wall 50 extending perpendicularly or substantially perpendicularly from the other edge of the base 46. The base 46 defines openings 52 along the edges of the base 46 not having the first and second walls 48 and 50. Each of the openings 52 is configured to receive a fastener 53, such as a screw, bolt, rivet or any other suitable type of fastener for securing the base 46 to the surface 26 of the central support 24. Alternatively, the base 46 can be secured to the surface 26 of the central support 24 by welding, or the base 46 can be configured as an integral part of the central support 24. In this example, the hub baseplate 40 is recessed at or about 9.00 inches from the outer surface of the antenna feed hub 20, or any suitable distance depending on the dimensions of the antenna feed hub 20.

Figure 17:
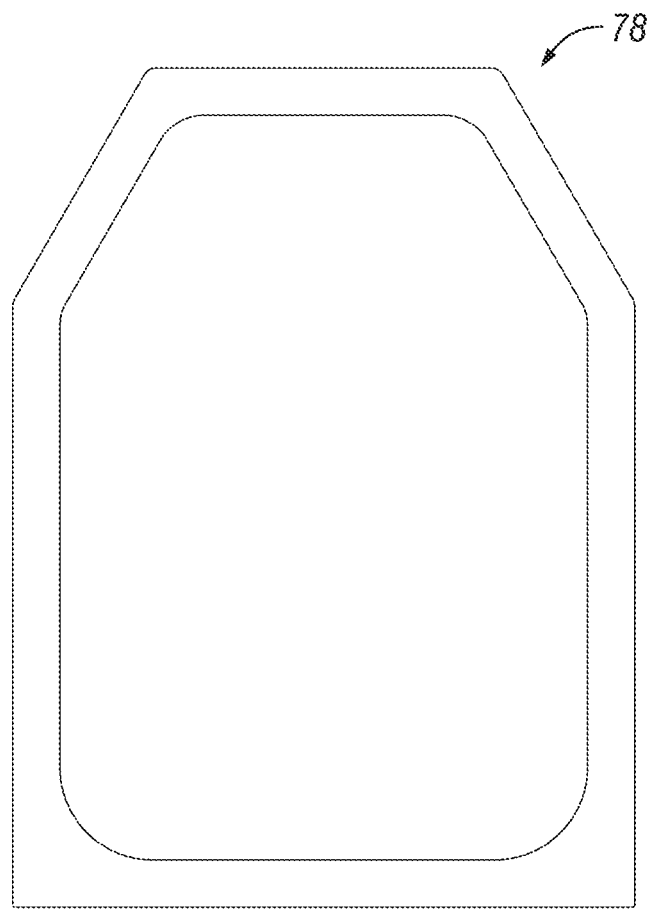
FIG. 17 is a front view of an example of a guide plate.
Figure 18:
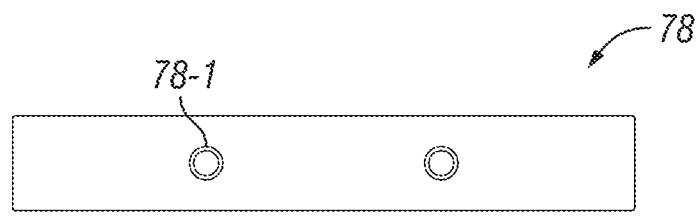
FIG. 18 is a bottom view of the guide plate shown in FIG. 17.

The base 46 further defines openings 54 for securing the first and second BUC assemblies 42 and 44 to the base 46 as discussed in more detail below. The base 46 also defines a central opening 56 that allows for access to the antenna feed 28 through the base 46. The base 46 further defines an antenna module mounting apparatus configured in this example as a plurality of elongated openings 58. As discussed in more detail below, each of the elongated openings 58 includes an alignment portion 60 configured as a wider portion of the elongated opening 58 and a retention portion 62 configured as a narrower portion of the elongated opening 58. The base 46 defines additional mounting openings 64 for mounting other components or equipment as necessary or desired. Also, each of the first and second walls 48 and 50 defines openings 66. In this example, a stop/guide bar 68 as shown in more detail in FIGS. 9-12 and which can also be referred to as an alignment post 68 or any other suitable term, is mounted near one end each of the first and second walls 48 and 50 by a fastener 70, such as a screw, bolt, rivet or any other suitable type of fastener that is received into an opening 68-1 in the stop/guide bar 68 and into an opening 66 for securing a stop/guide bar 68 to the first wall 48 or the second wall 50. Also, a stop/guide bar 72, as shown in more detail in FIGS. 13-16 and which can also be referred to as an alignment post 72 or any other suitable term, is mounted near the other end each of the first and second walls 48 and 50 by a fastener 74, such as a screw, bolt, rivet or any other suitable type of fastener that is received into an opening 72-1 in the stop/guide bar 68 and into an opening 66 for securing a stop/guide bar 72 to the first wall 48 or the second wall 50. Alternatively, the stop/guide bars 68 and 72 can be secured to the first and second walls 48 and 50 by welding or in any other suitable manner, or can be made integrally with the first and second walls 48 and 50. As a further alternative, the stop/guide bars 68 and 72 can be secured to the surface 26 of the central support 24 directly by fasteners, welding or in any suitable manner, or can be made integrally with the central support 24. Each of the stop/guide bars 68 defines a notch 76, the purpose of which is discussed in more detail below. In addition, guide plates 78, which are shown in more detail in FIGS. 17 and 18 and can also be referred to as guide plates 78 or any other suitable term, each can have pentagonal shape. The guide plates 78 are mounted to the openings 64 in the base 46 by screws, rivets, bolts, or in any suitable manner that are received into openings 78-1, or can be welded to or integral with the base 46.

Figure 19:
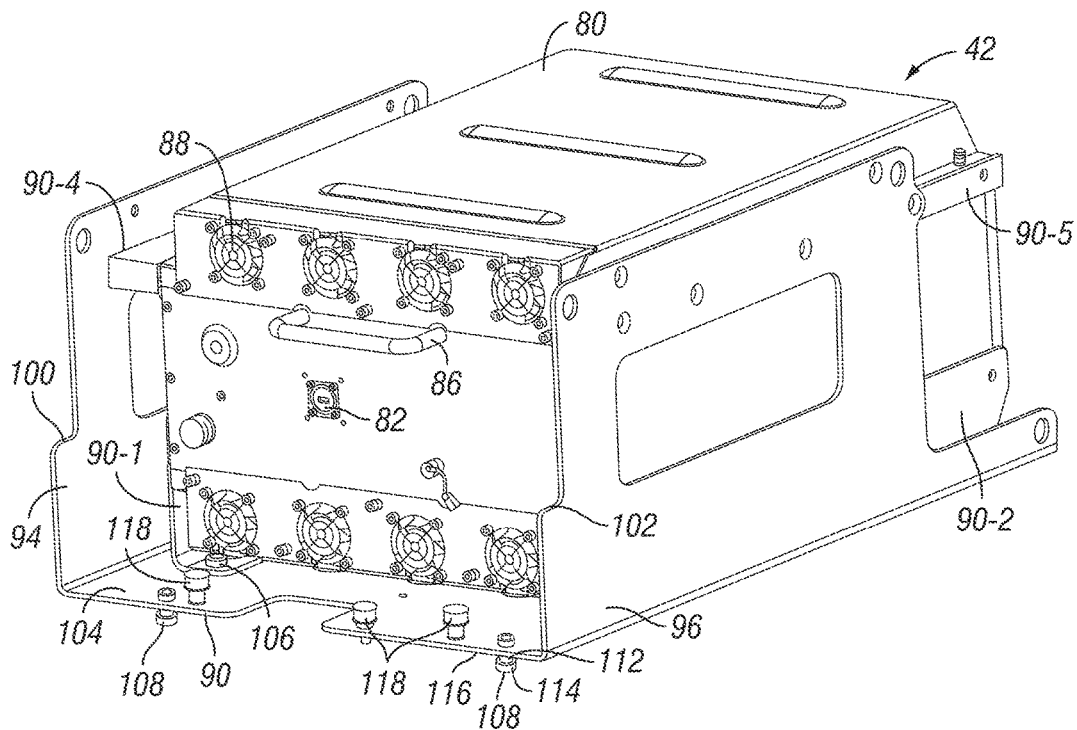
FIG. 19 is a front perspective view of the first block upconverter (BUC) assembly of the antenna module mounting apparatus.
Figure 20:
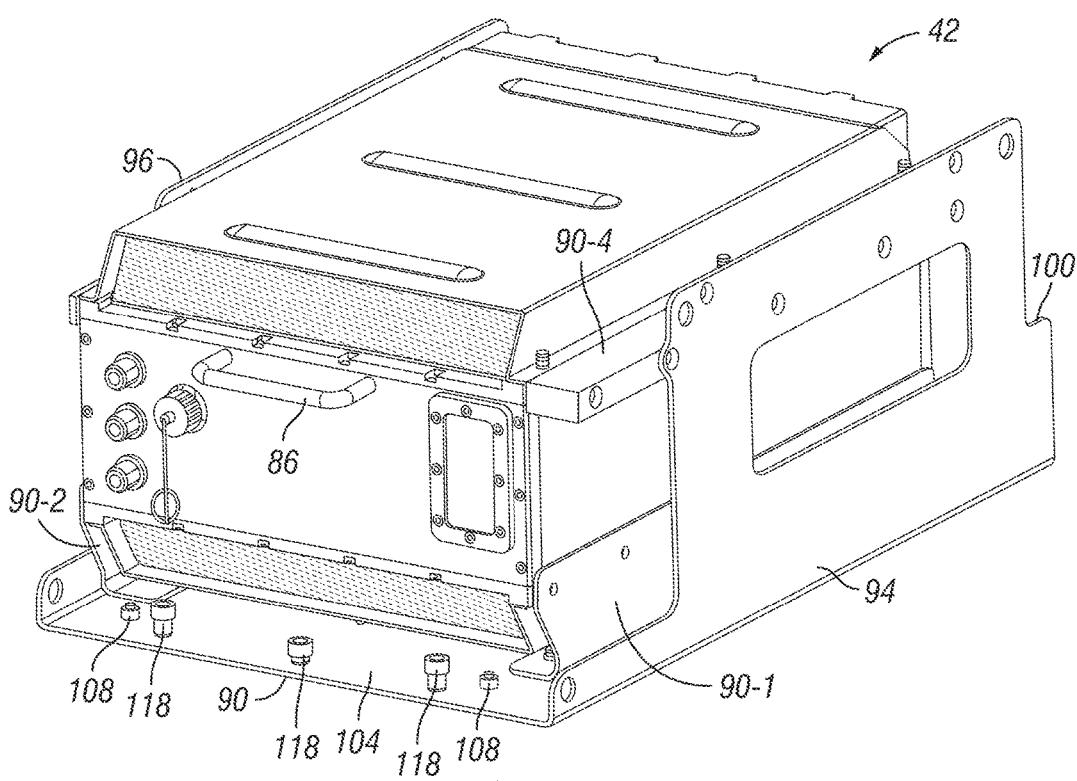
FIG. 20 is a rear perspective view of the first BUC assembly.
Figure 21:
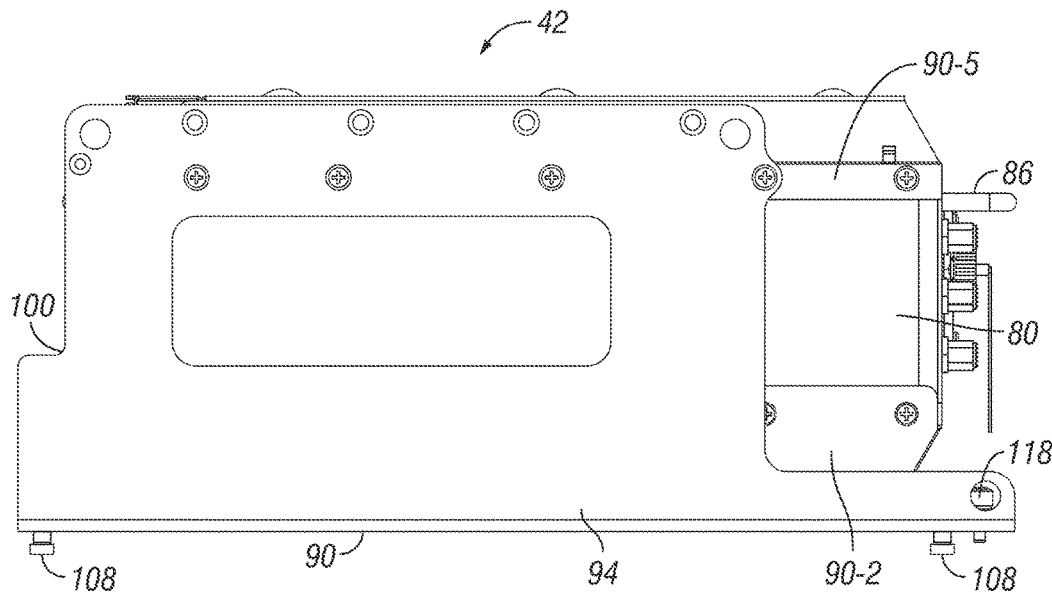
FIG. 21 is a side view of the first BUC assembly.
Figure 22:
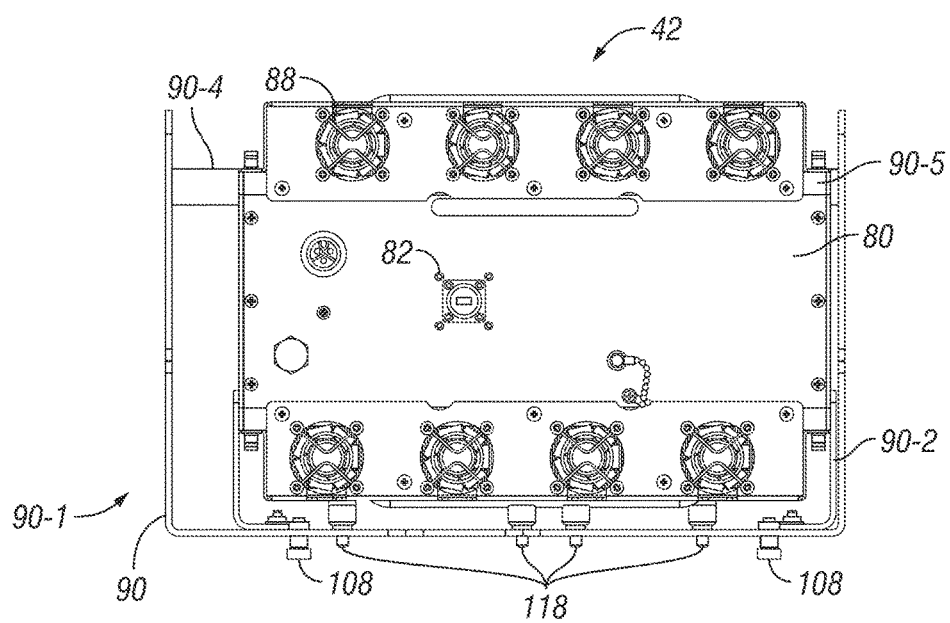
FIG. 22 is a front view of the first BUC assembly.
Figure 23:
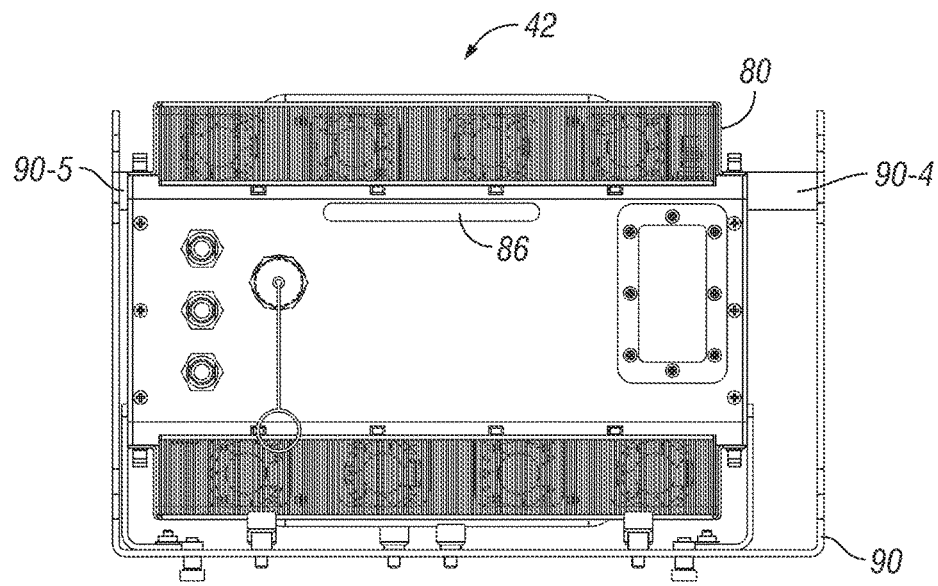
FIG. 23 is a rear view of the first BUC assembly.
Figure 24:
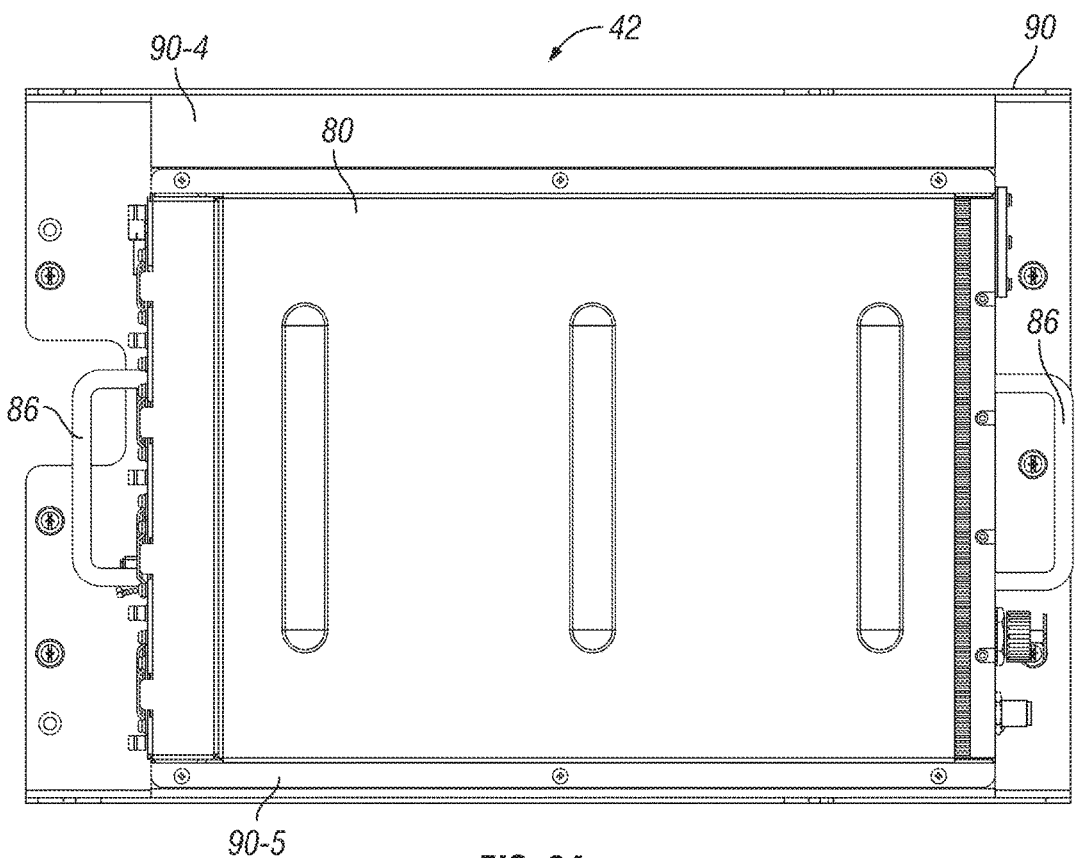
FIG. 24 is a top view of the first BUC assembly.
Figure 25:
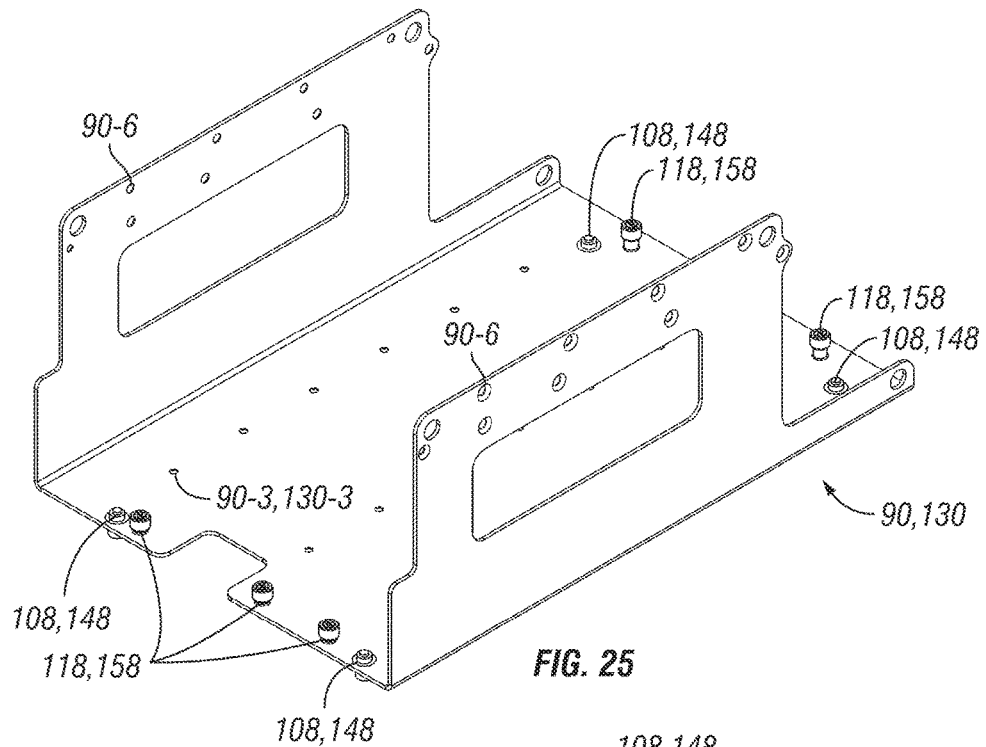
FIG. 25 is a front perspective top view of an example of a carrier chassis included in the first and second BUC assemblies.
Figure 26:
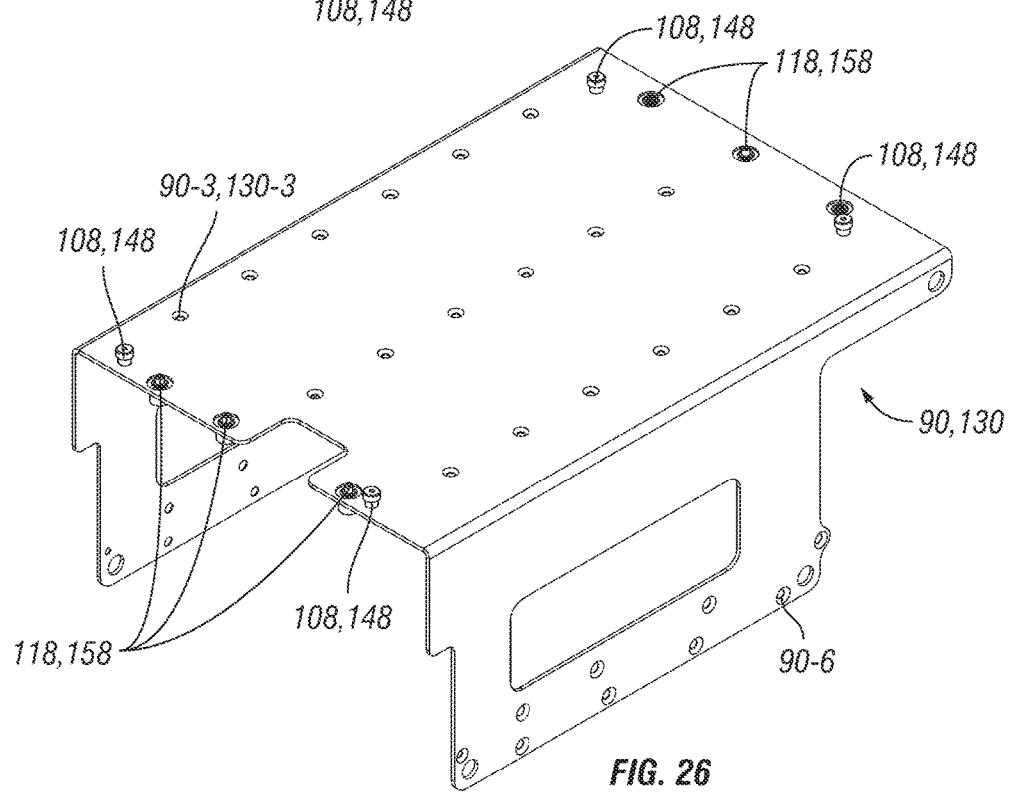
FIG. 26 is a front perspective bottom view of an example of a carrier chassis included in the first and second BUC assemblies.
Figure 27:
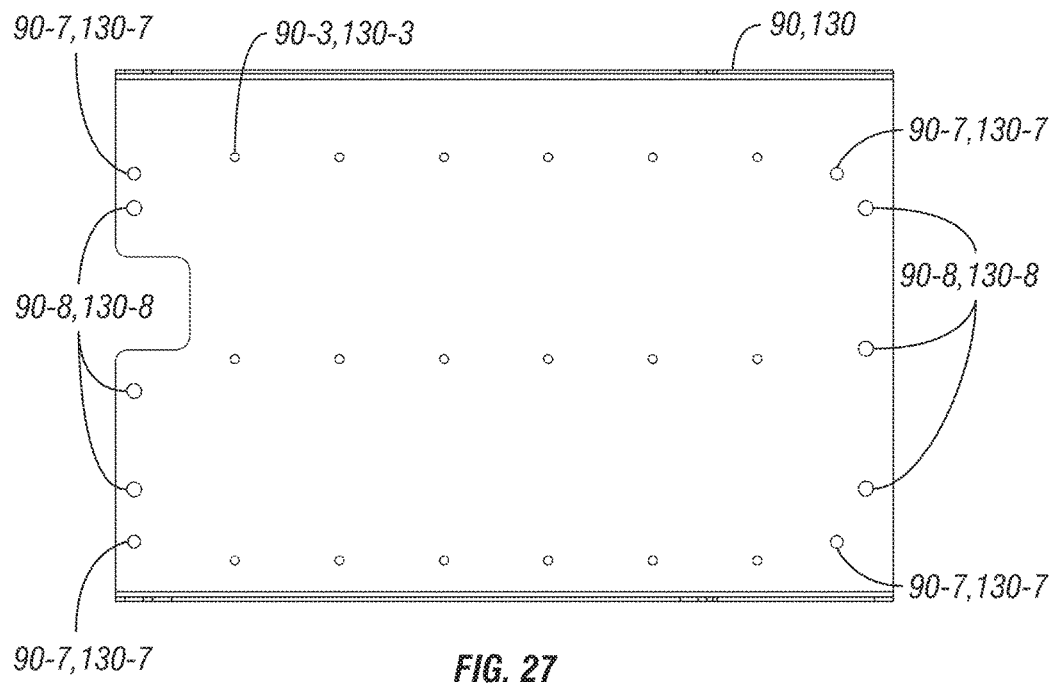
FIG. 27 is a top plan view of the carrier chassis shown in FIGS. 25 and 26.
Figure 28:
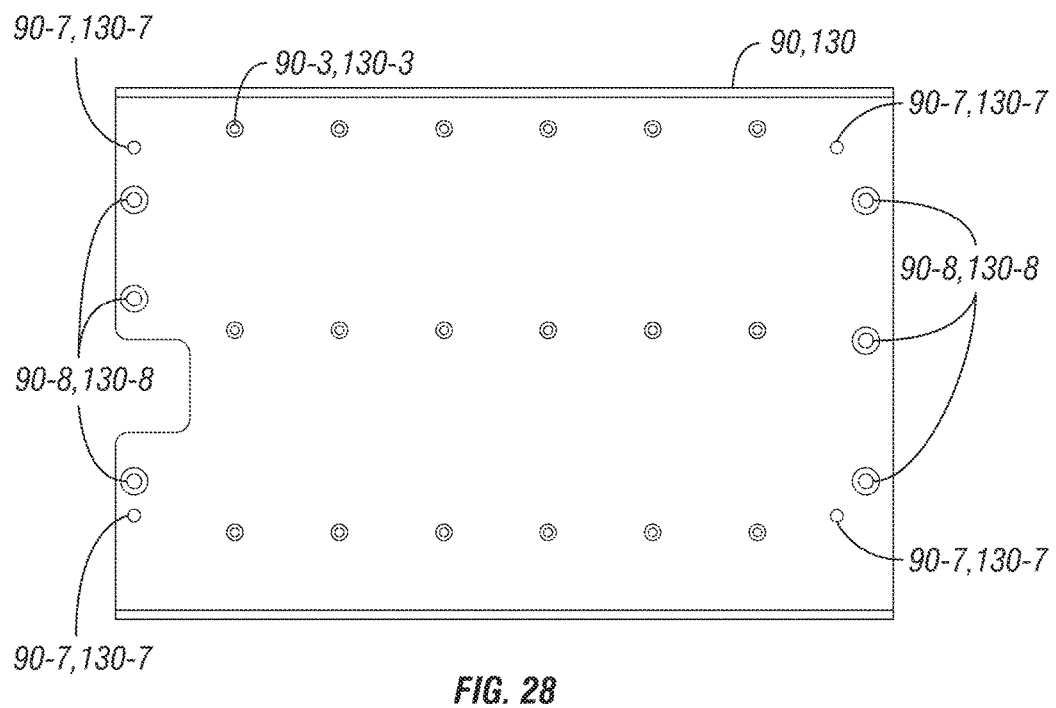
FIG. 28 is a bottom plan view of the carrier chassis shown in FIGS. 25 and 26.
Figure 29:
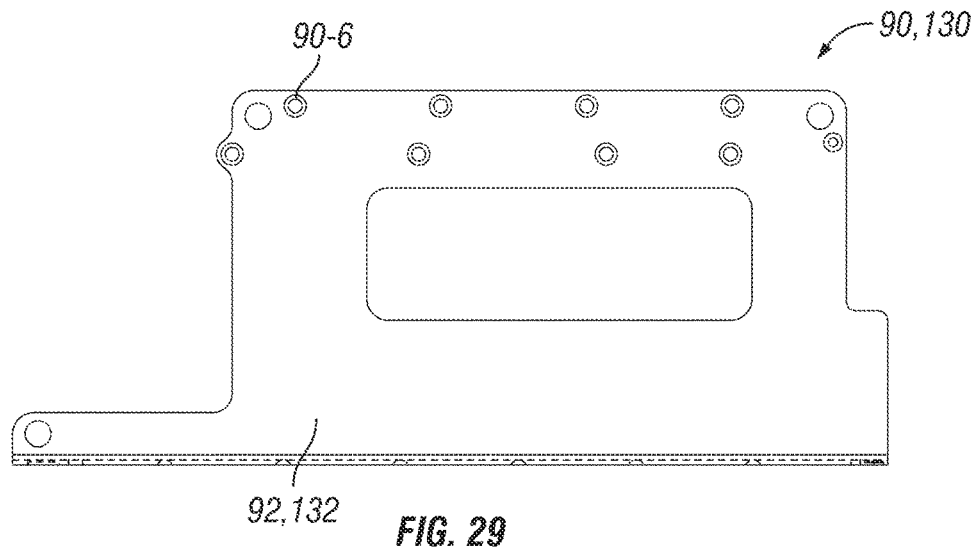
FIG. 29 is a left side elevational view of the carrier chassis shown in FIGS. 25 and 26.
Figure 30:
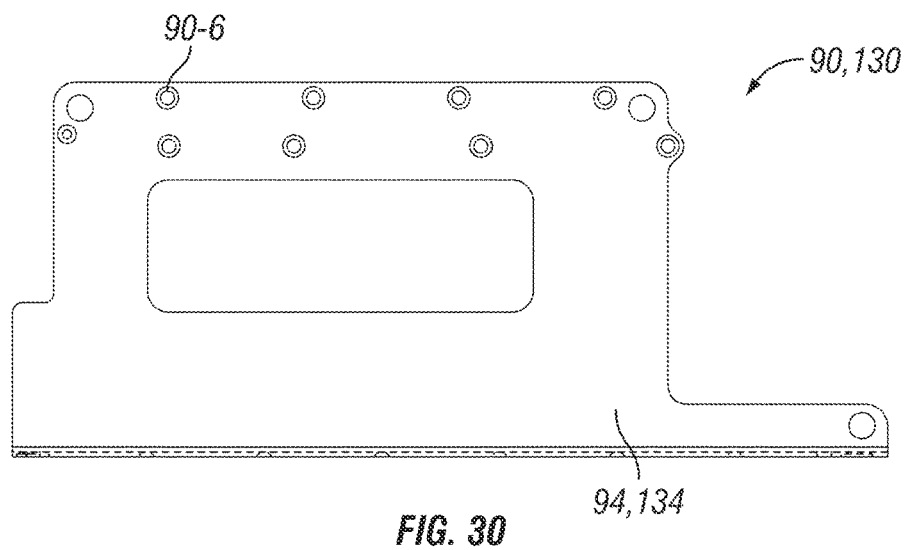
FIG. 30 is a right side elevational view of the carrier chassis shown in FIGS. 25 and 26.
Figure 31:
FIG. 31 is a front elevational view of the carrier chassis shown in FIGS. 25 and 26.
Figure 32:
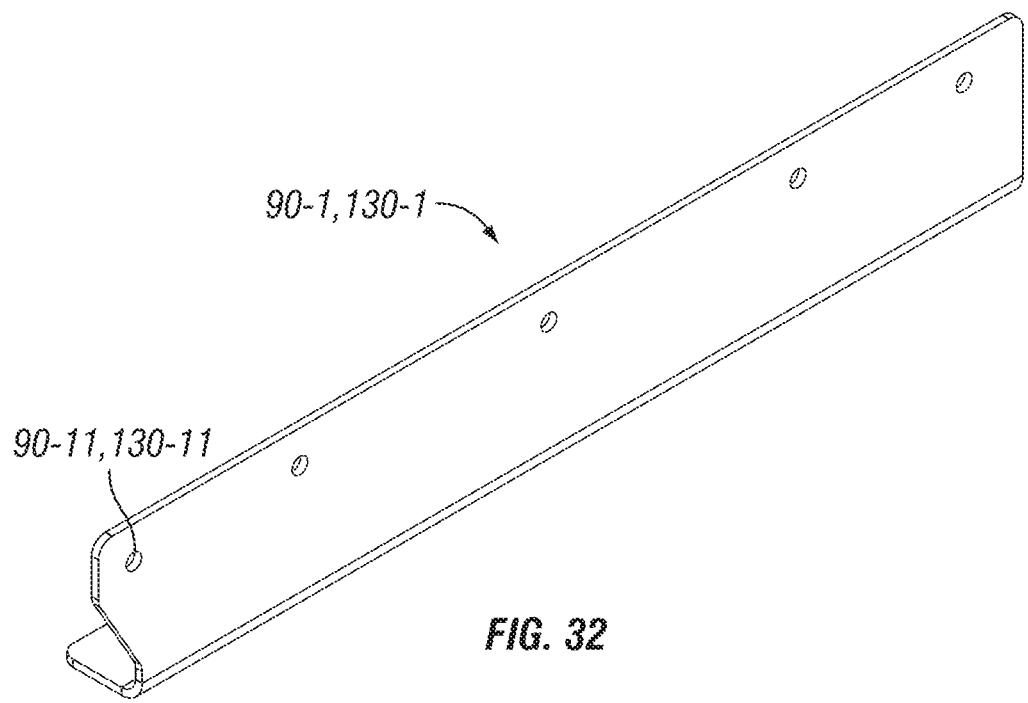
FIG. 32 is a front perspective view of one side of the left lifting angle included in the first BUC assembly.
Figure 33:
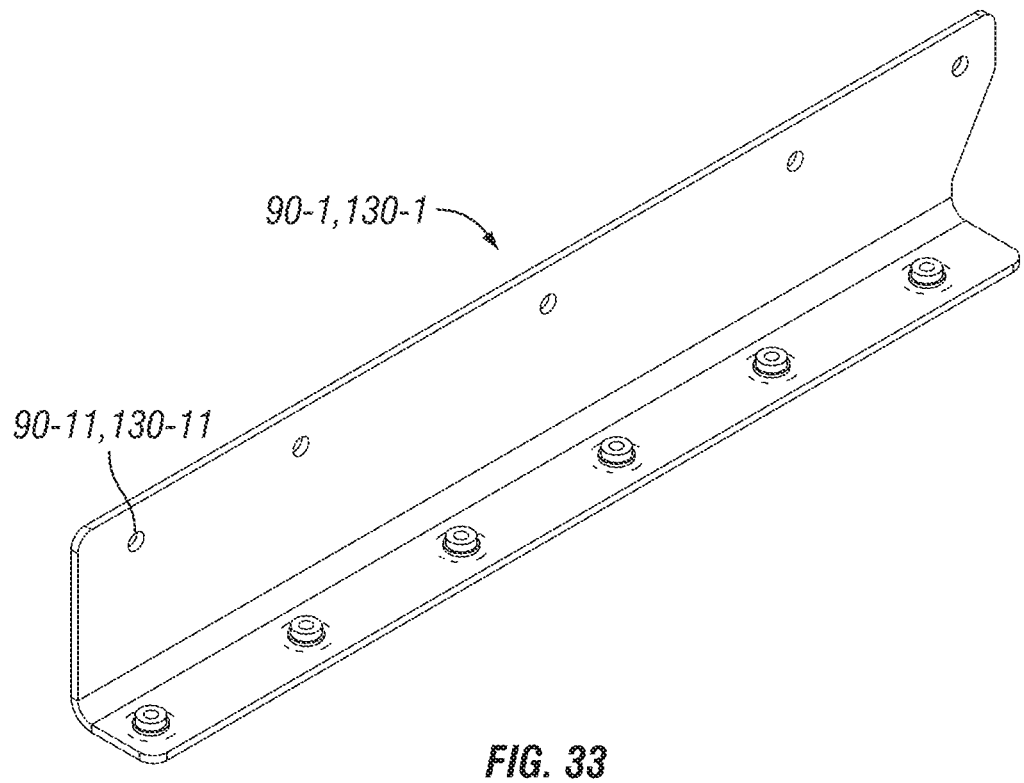
FIG. 33 is a perspective view of another side of the left lifting angle included in the first BUC assembly.
Figure 34:
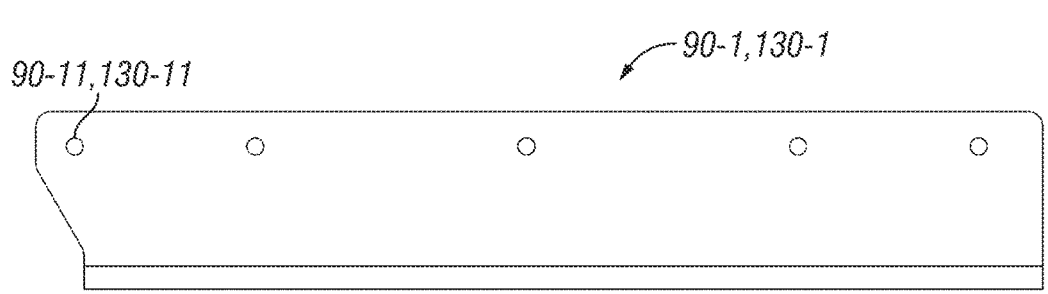
FIG. 34 is a side elevational view of the left lifting angle as taken from the side shown in FIG. 32.
Figure 35:
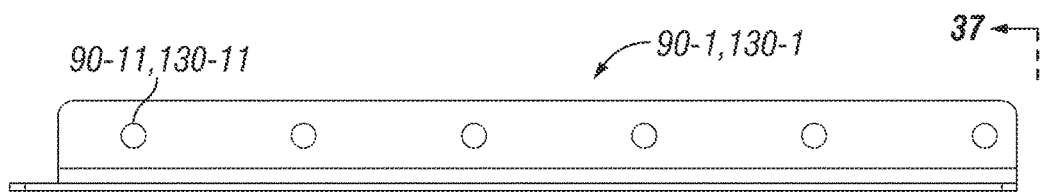
FIG. 35 is a top plan view of the left lifting angle as taken from the view shown in FIG. 33.
Figure 36:
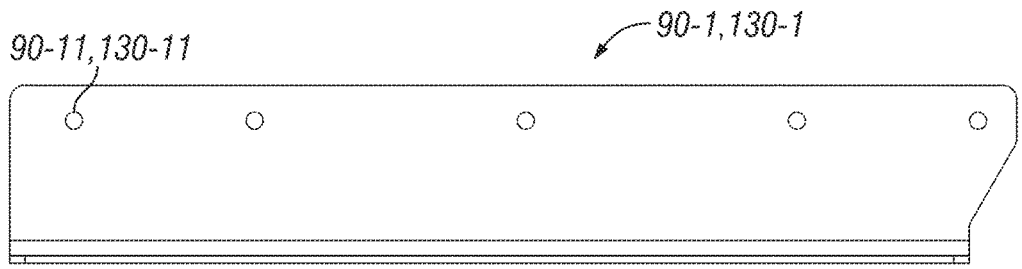
FIG. 36 is a side elevational view of the left lifting angle as taken from the side shown in FIG. 33.
Figure 37:
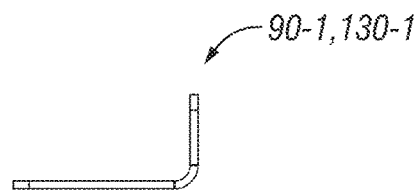
FIG. 37 is a front view of the left lifting angle as taken along the arrows 37-37 in FIG. 35.
Figure 38:
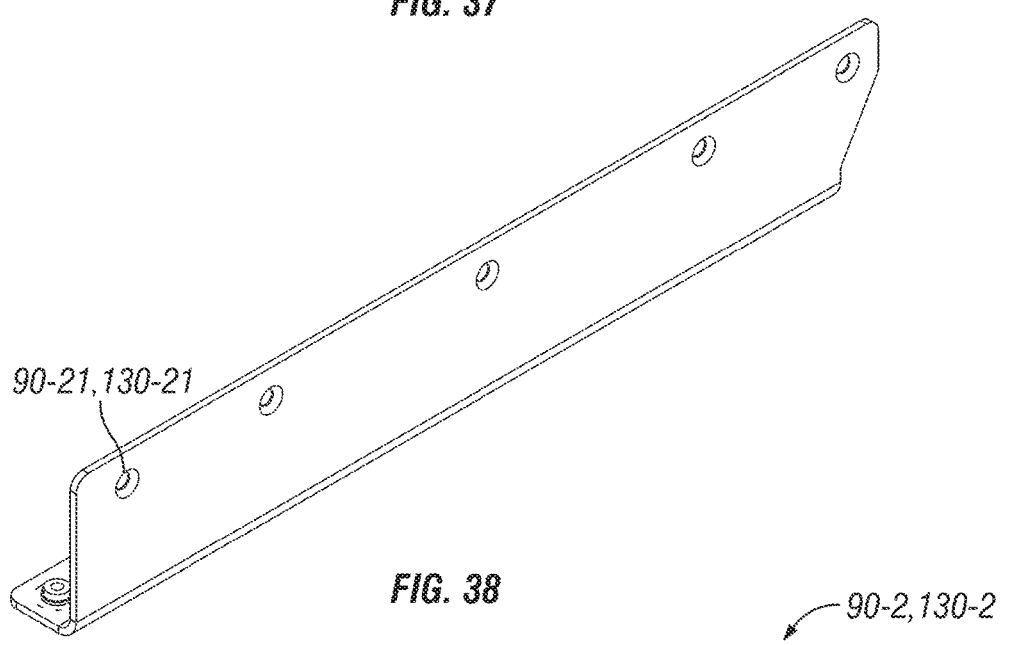
FIG. 38 is a front perspective view of one side of the right lifting angle included in the first BUC assembly.
Figure 39:
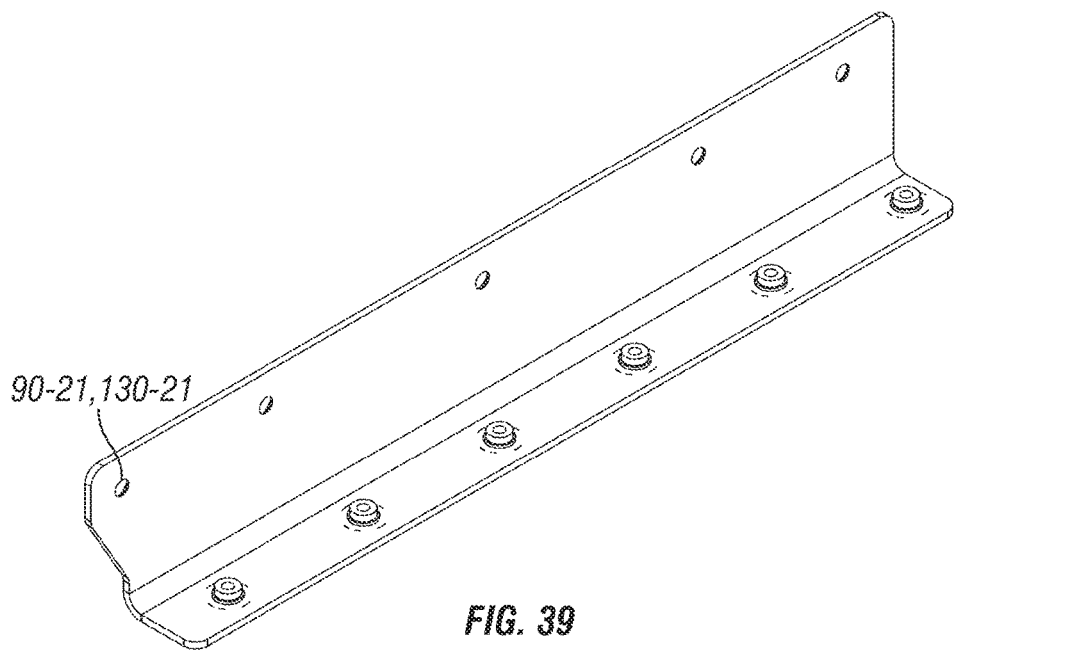
FIG. 39 is a perspective view of another side of the right lifting angle included in the first BUC assembly.
Figure 40:
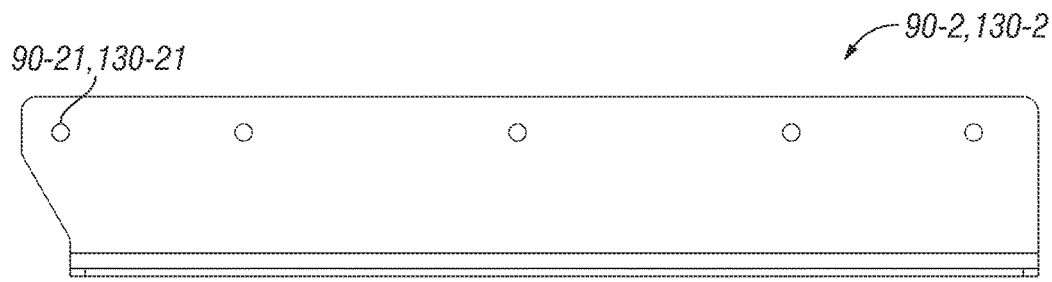
FIG. 40 is a side elevational view of the right lifting angle as taken from the side shown in FIG. 38.
Figure 41:
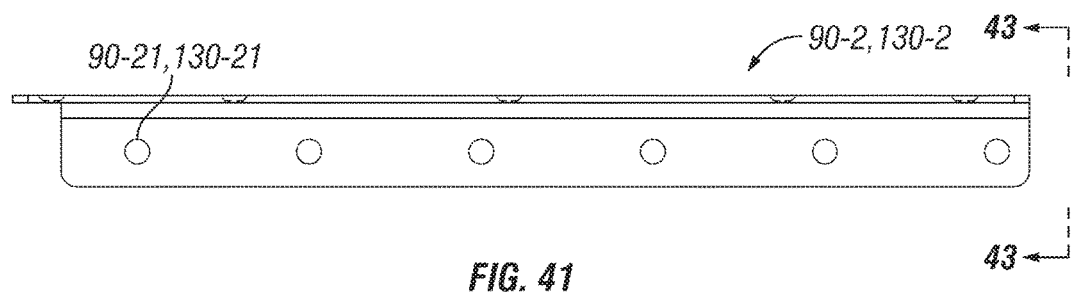
FIG. 41 is a top plan view of the right lifting angle as taken from the view shown in FIG. 39.
Figure 42:
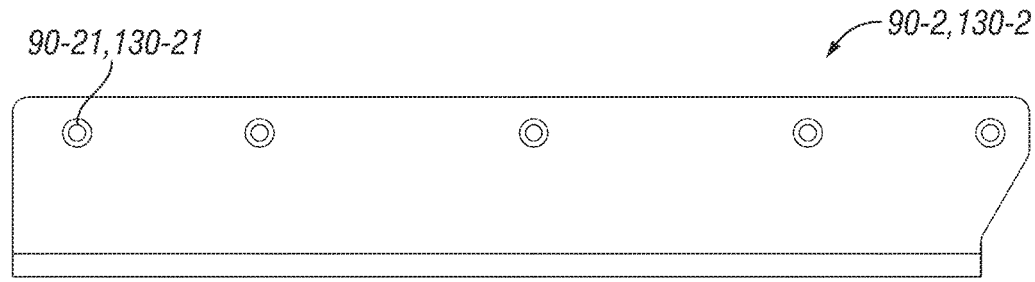
FIG. 42 is a side elevational view of the right lifting angle as taken from the side shown in FIG. 39.
Figure 43:
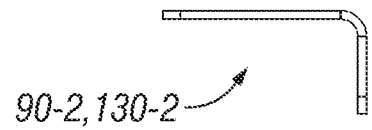
FIG. 43 is a front view of the right lifting angle as taken along the arrows 43-43 in FIG. 41.
Figure 44:
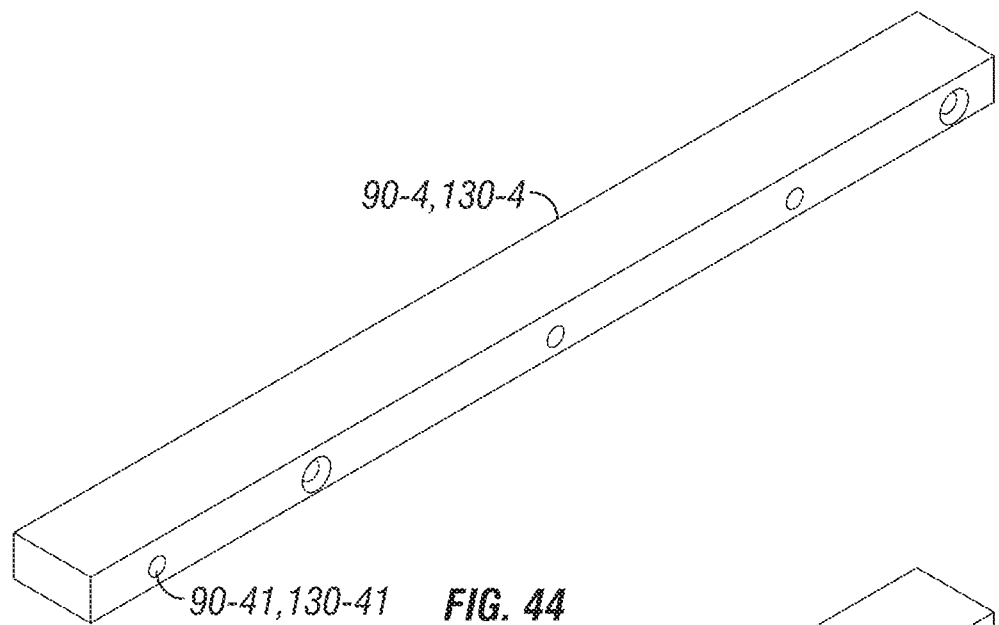
FIG. 44 is a perspective view of one side of a mounting bar included in the first BUC assembly.
Figure 45:
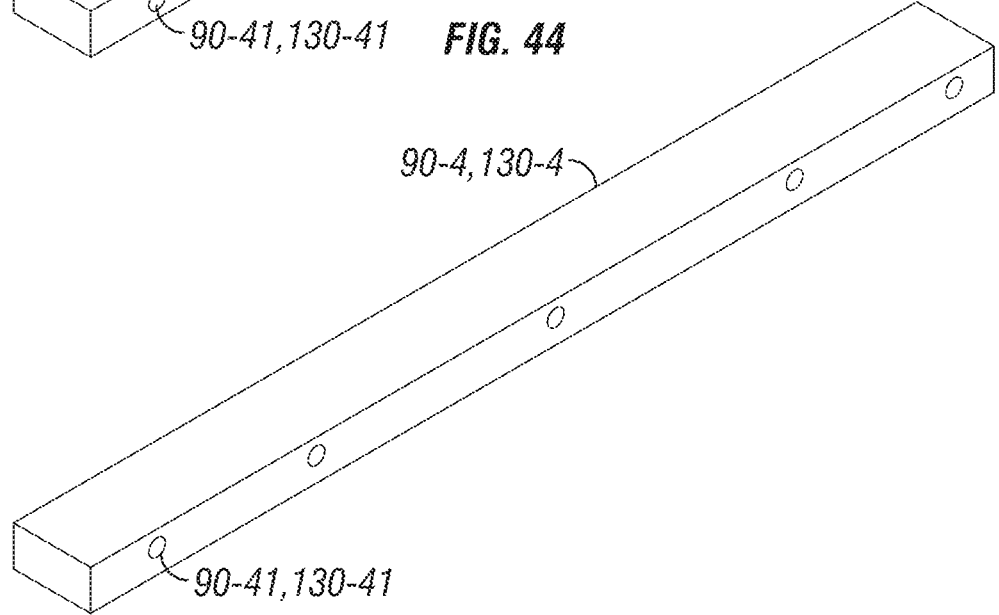
FIG. 45 is a perspective view of another side of the mounting bar included in the first BUC assembly.
Figure 46:
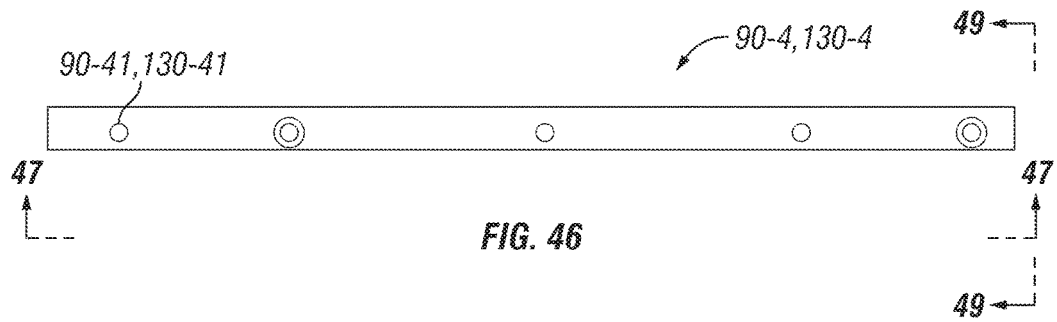
FIG. 46 is a side elevational view of the mounting bar as taken from the side shown in FIG. 44.
Figure 47:
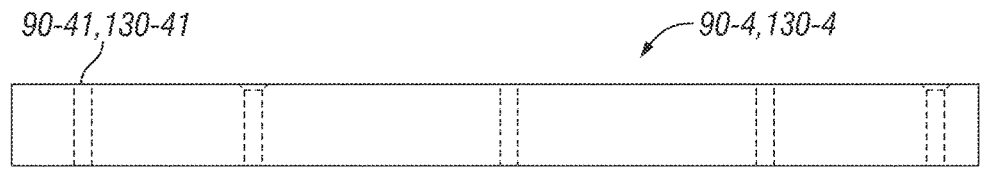
FIG. 47 is a plan view of the mounting bar as taken along arrows 47-47 in FIG. 46.
Figure 48:
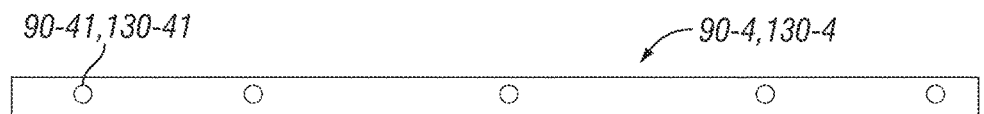
FIG. 48 is a side elevational view of the mounting bar as taken from the side shown in FIG. 45.
Figure 49:
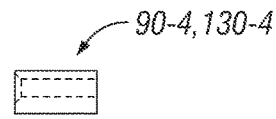
FIG. 49 is an end view of the mounting bar as taken along lines 49-49 in FIG. 46.
Figure 50:
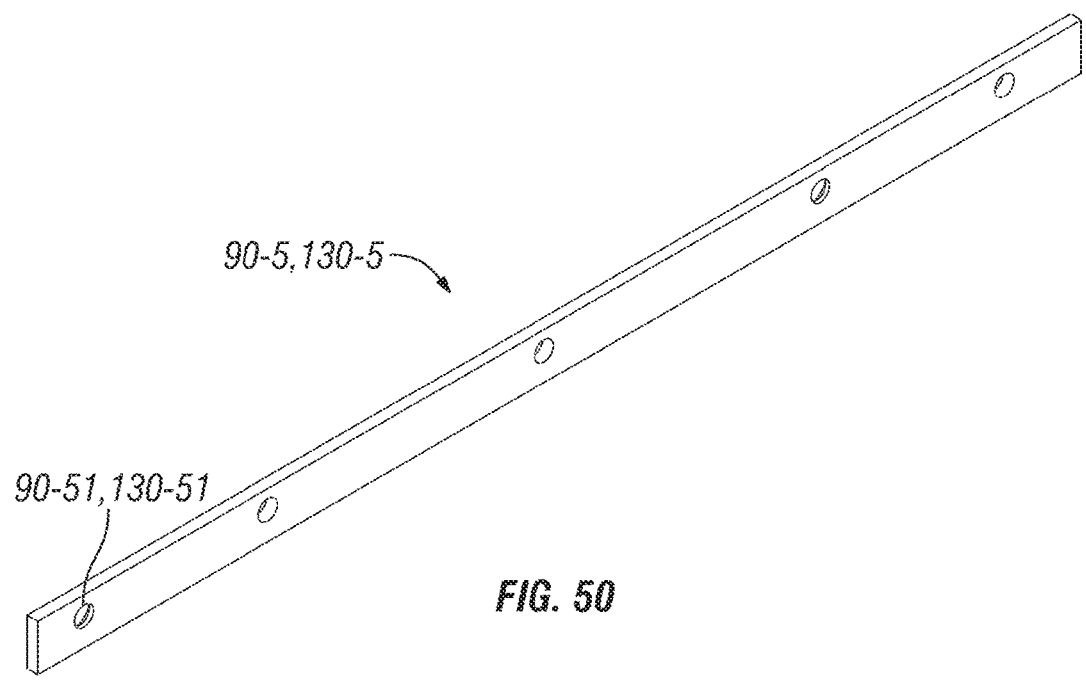
FIG. 50 is a perspective view of one side of a shim bar included in the first BUC assembly.
Figure 51:
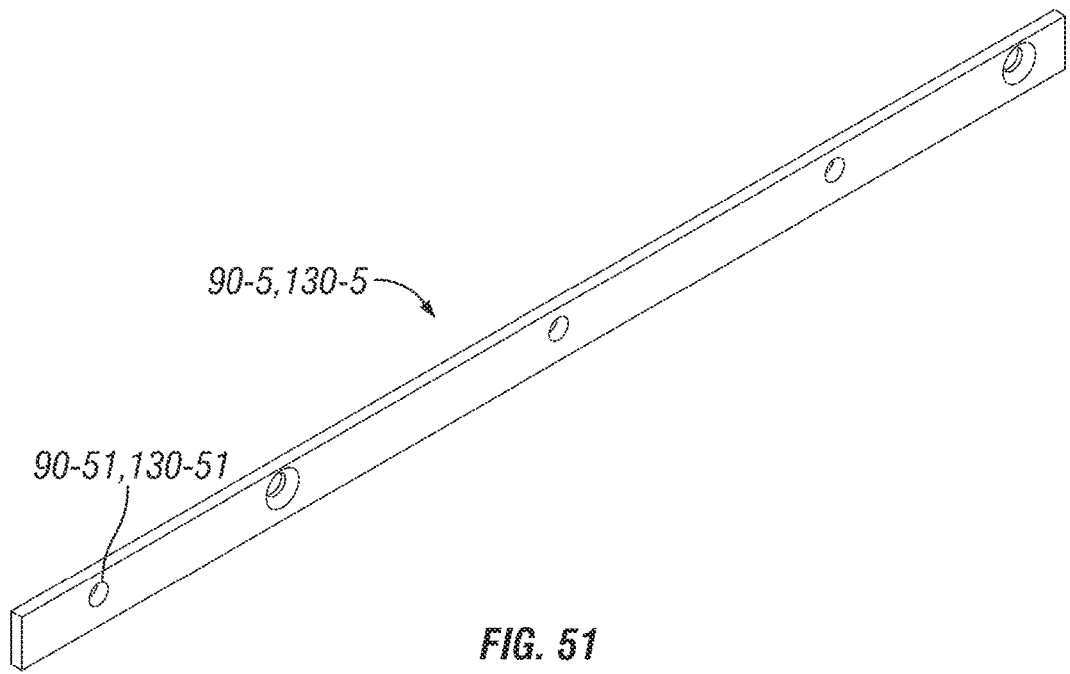
FIG. 51 is a perspective view of another side of the shim bar included in the first BUC assembly.
Figure 52:
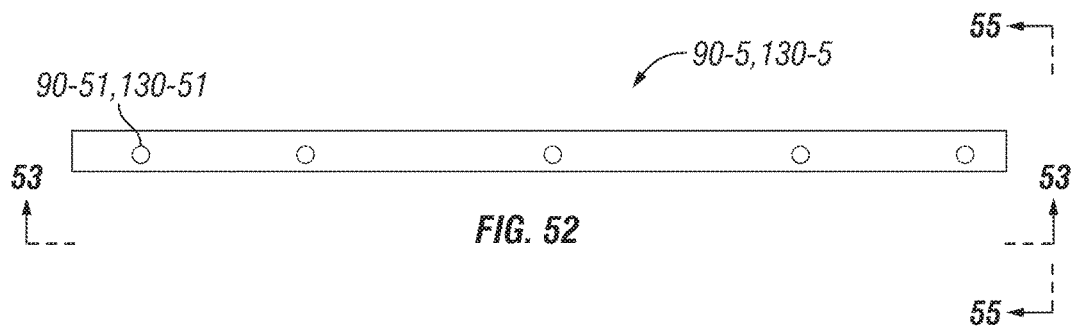
FIG. 52 is a side elevational view of the shim bar as taken from the side shown in FIG. 50.
Figure 53:
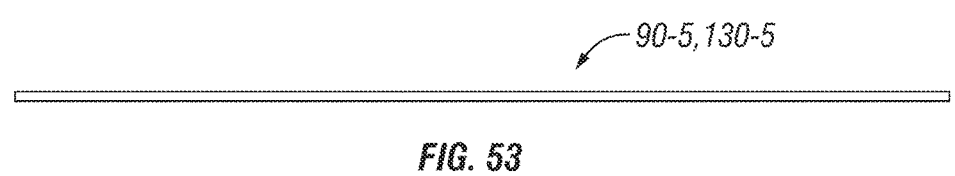
FIG. 53 is a plan view of the shim bar as taken along arrows 47-47 in FIG. 52.
Figure 54:
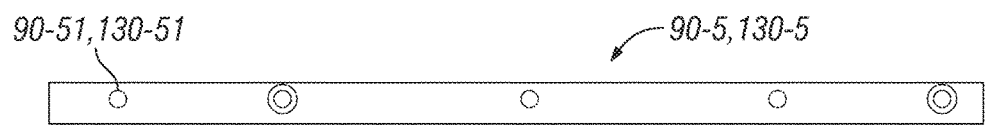
FIG. 54 is a side elevational view of the shim bar as taken from the side shown in FIG. 51.
Figure 55:
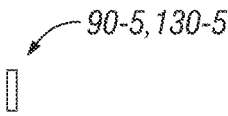
FIG. 55 is an end view of the shim bar as taken along lines 55-55 in FIG. 52.

The first BUC assembly 42 in this example includes a BUC 80, such as a BUC manufactured by CPI, or any other conventional BUC or suitable component. The BUC 80 can be referred to generally as an antenna hub amplifier. As shown in more detail in FIGS. 19 and 20, the BUC 80 includes a port 82 that couples to one end of a waveguide 84. The waveguide 84 passes through at least one of the guide plates 78 and through the central opening 56 in the base 46 of the hub baseplate 40. Thus, the other end of the waveguide 84 couples to the antenna feed 28 in any suitable manner as understood in the art. The BUC 80 also includes, for example, a handle 86 and other connection ports 88 and so on as in any conventional BUC. The guide plates 78 protect the waveguide 84.

The first BUC assembly 42 further includes a carrier chassis 90 that can be made of any type of metal or any other suitable material as understood in the art. Further details of the carrier chassis 90 are shown in FIGS. 25-31. Also, as discussed below, the carrier chassis 90 is also included in the second BUC assembly 44. Therefore, FIG. 25-31 include reference numerals for the corresponding components of the chassis 130 for the second BUC assembly 44 as discussed below.

Figure 8:
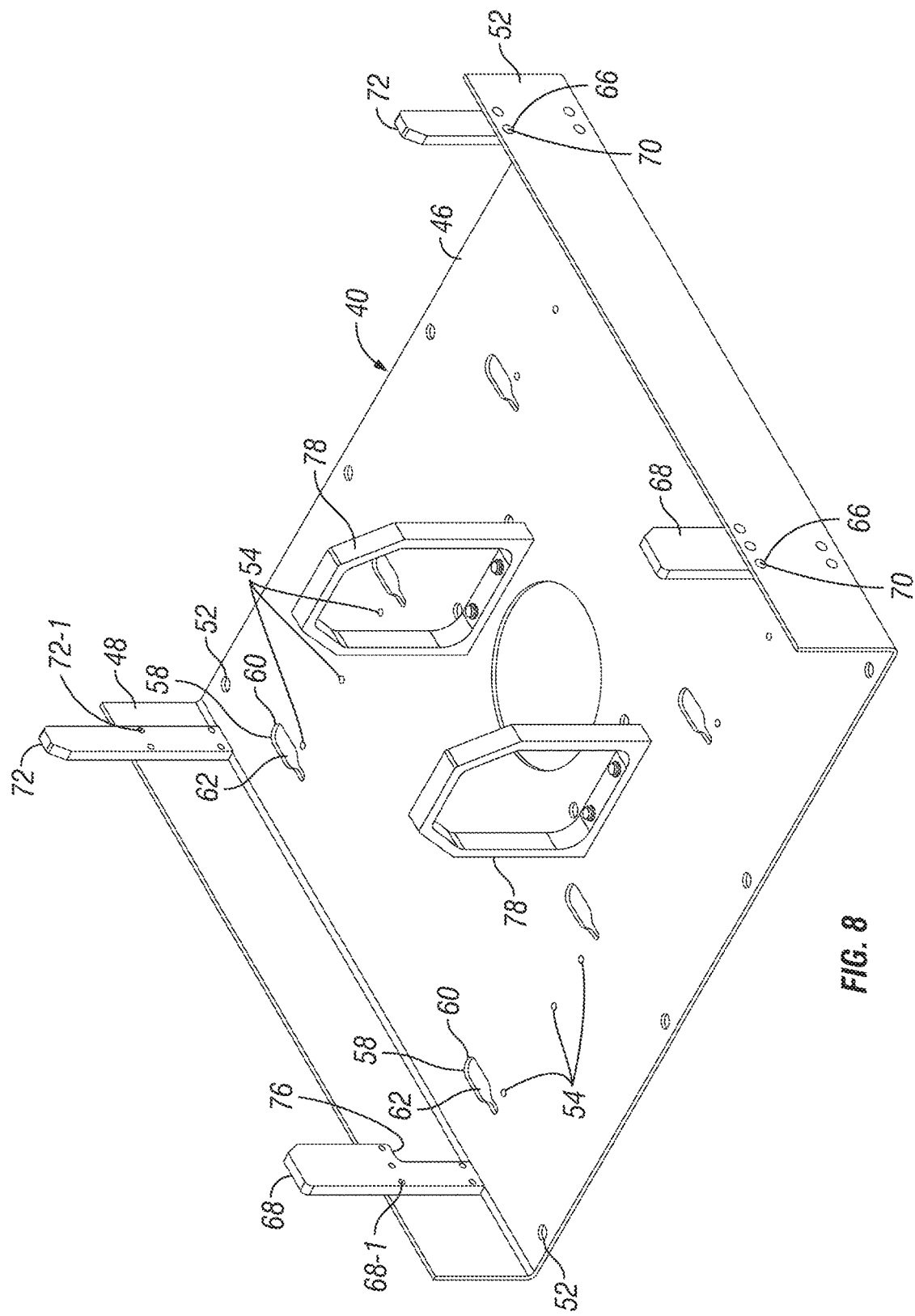
FIG. 8 is a top perspective view of an example of a hub baseplate attached to the antenna feed hub shown in FIG. 2 with the stop/guide bars and guide plates attached.
Figure 9:
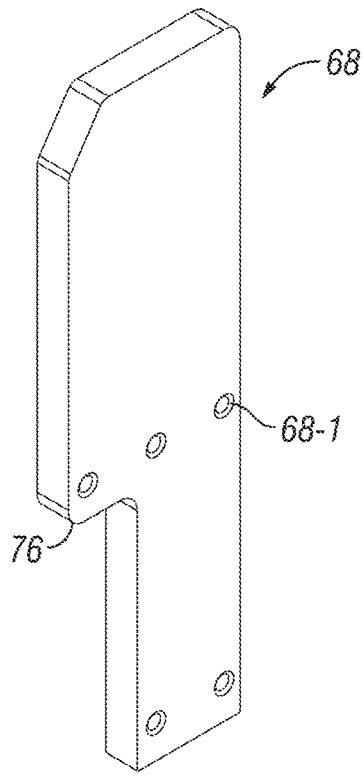
FIG. 9 is a perspective view of an example of one type of stop/guide bar.
Figure 10:
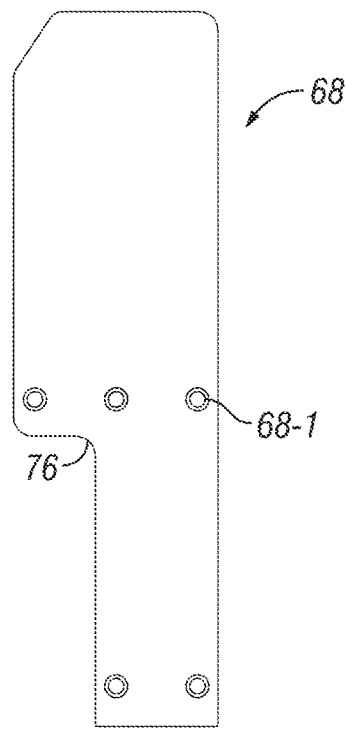
FIG. 10 is a front view of the stop/guide bar shown in FIG. 9.
Figure 11:
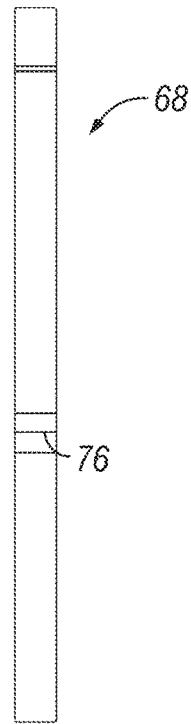
FIG. 11 is a side view of the stop/guide bar shown in FIG. 9.
Figure 12:
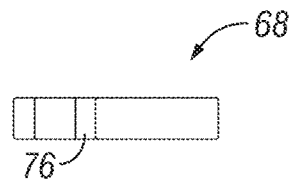
FIG. 12 is a bottom view of the stop/guide bar shown in FIG. 9.
Figure 13:
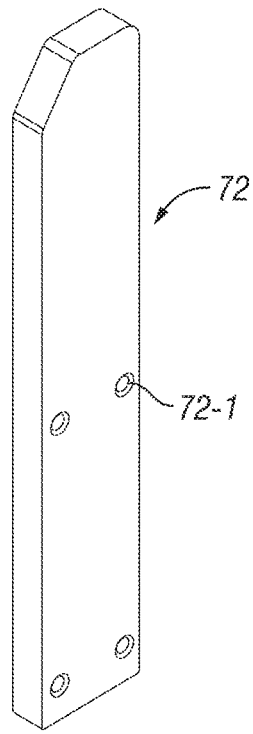
FIG. 13 is a perspective view of an example of another type of stop/guide bar.
Figure 14:
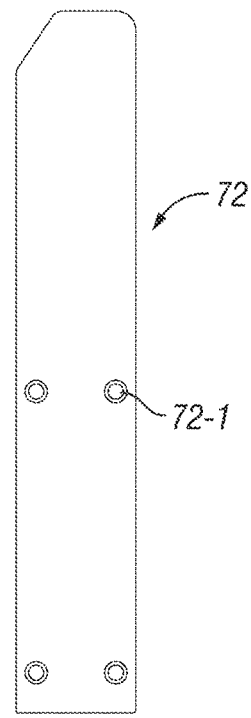
FIG. 14 is a front view of the stop/guide bar shown in FIG. 13.
Figure 15:
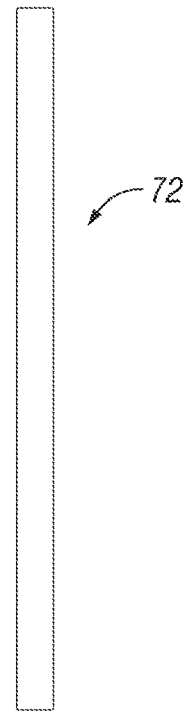
FIG. 15 is a side view of the stop/guide bar shown in FIG. 13.
Figure 16:
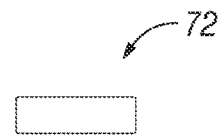
FIG. 16 is a bottom view of the stop/guide bar shown in FIG. 13.

The carrier chassis 90 of the first BUC assembly 42 includes a base 92, a first wall 94 that extends perpendicularly or substantially perpendicularly from one edge of the base 92, and a second wall 96 that extends perpendicularly or substantially perpendicularly from the other edge of the base 92. The first wall 94 defines a notch 100 and the second wall 96 defines a notch 102, the purpose of which are discussed in more detail below. As shown in more detail in FIGS. 8 and 9, the BUC 80 is mounted to a surface 104 of the base 92 of the carrier chassis 90 by fasteners 106 such as screws, shoulder screws, bolts, rivets or any other suitable type of fastener as understood in the art. In this example, the BUC 80 is mounted to a left lifting angle 90-1 and a right lifting angle 90-2 as shown in more detail in FIGS. 32-43 by fasteners 106 such as screws, shoulder screws, bolts, rivets or any other suitable type of fastener as understood in the art. The left lifting angle 90-1 and the right lifting angle 90-2 are mounted to the carrier chassis 90 into openings 90-3 by fasteners 106 such as screws, shoulder screws, bolts, rivets or any other suitable type of fastener as understood in the art that can be received into openings 90-11 and 90-21. The BUC 80 is further secured to the carrier chassis 90 by a mounting bar 90-4 as shown in more detail in FIGS. 44-49, and a shim bar 90-5 as shown in more detail in FIGS. 50-55 by fasteners 106 such as screws, shoulder screws, bolts, rivets or any other suitable type of fastener as understood in the art, that are received into openings 90-41 in the mounting bar 90-4 and into openings 90-51 in the shim bar 90-5, and into openings 90-6 in the carrier chassis 90.

As further illustrated, the carrier chassis 90 includes an engaging apparatus which, in this example, includes a plurality of engaging pins 108. Each of the engaging pins 108 is secured to the base 92 by screwing or press fitting into openings 90-7 which are shown in more detail in FIGS. 27 and 28, or by welding or in any suitable manner, and extends outward from a lower surface 110 of the base 92 that is opposite to the surface 104 of the base 92. Each of the engaging pins 108 includes a narrow shaft portion 112 and a wide diameter top portion 114 defining an edge 116. The diameter of the wide diameter top portion 114 is greater than the width of the narrower retention portion 62. As discussed in more detail below, during mounting of the first BUC assembly 42 to the hub baseplate 40, each of the engaging pins 108 is received into a respective elongated opening 58 in the hub baseplate 40. As discussed in more detail below, an engaging pin 108 is initially received into the wider alignment portion 60 of the elongated opening 58, and then moved into the narrower retention portion 62 when the first BUC assembly 42 is moved in the direction toward the narrower retention portion 62. The carrier chassis 90 further includes fasteners 118, such as screws, which pass through the base 92 via openings 90-7 which are shown in more detail in FIGS. 27 and 28, and in this example are rotatably secured to the base 92 to rotate about their own respective longitudinal axis. Each of the fasteners 118 is received into a respective opening 54 to removably secure the carrier chassis 90, and therefore the entire first BUC assembly 42, to the base 46 of the hub baseplate 40 as discussed in more detail below. Also, each of the fasteners 118 also allow for some movement or play between the base 92 and the openings 54. For instance, a fastener 118 can allow for movement of the base 92 at or about ⅛ of an inch in any direction with respect to opening 54 to which the fastener 118 is going to mate, to provide the fine adjustment once the engaging pins 108 of the carrier chassis 90 slide through the elongated openings 58 as discussed herein. Naturally, the hub baseplate 40 can alternatively be configured to include engaging pins 108, and the carrier chassis 90 can alternatively be configured to include the elongated openings 58, or the hub baseplate 40 and the carrier chassis 90 can each be configured to include a combination of elongated openings 58 and engaging pins 108 that mate with opposing engaging pins 108 and elongated openings 58 in the manner described herein.

Figure 56:
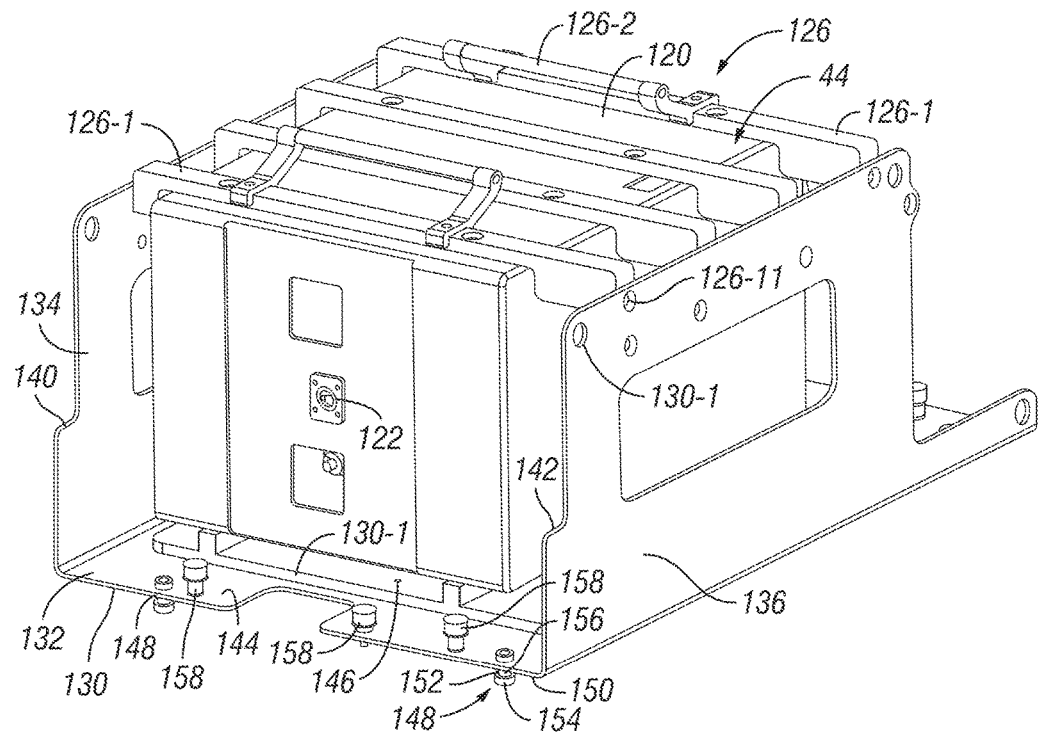
FIG. 56 is a front perspective view of a second BUC assembly of the antenna module mounting apparatus.

The second BUC assembly 44 in this example includes a BUC 120, such as a BUC manufactured by WAVESTREAM, or any other conventional BUC or suitable component. The BUC 120 can be referred to generally as an antenna hub amplifier. As shown in more detail in FIGS. 56-58, the BUC 120 includes a port 122 that couples to one end of a waveguide 124. The waveguide 124 passes through at least one of the guide plates 78 and through the central opening 56 in the base 46 of the hub baseplate 40. Thus, the other end of the waveguide 124 couples to the antenna feed 28 in any suitable manner as understood in the art. The second BUC assembly 44 also includes, for example, cross bar and handle assembly 126 as discussed in more detail below. The BUC 120 further includes other connection ports 128 and so on as in any conventional BUC. The guide plates 78 protect the waveguide 124.

The second BUC assembly 44 further includes a carrier chassis 130, as shown in FIGS. 25-31 as discussed above, that can be made of any type of metal or any other suitable material as understood in the art. The carrier chassis 130 includes a base 132, a first wall 134 that extends perpendicularly or substantially perpendicularly from one edge of the base 132, and a second wall 136 that extends perpendicularly or substantially perpendicularly from the other edge of the base 132. The first wall 134 defines a notch 140 and the second wall 136 defines a notch 142, the purpose of which are discussed in more detail below. As shown in more detail in FIGS. 56 and 57, the BUC 120 is mounted to a surface 144 of the base 132 of the carrier chassis 130 by a lifting plate 130-1 by fasteners 146 such as screws, shoulder screws, bolts, rivets or any other suitable type of fastener as understood in the art which pass though openings 130-11 into openings 130-1 in the carrier chassis 130. The BUC 120 is secured to the lifting plate 130-1 by fasteners (not shown) such as screws, shoulder screws, bolts, rivets or any other suitable type of fastener as understood in the art that pass through openings 130-12. The lifting plate 130-1 is thus secured to the carrier chassis 130 by fasteners 146 such as screws, shoulder screws, bolts, rivets or any other suitable type of fastener as understood in the art.

As further illustrated, the carrier chassis 130 includes an engaging apparatus which, in this example, includes a plurality of engaging pins 148. Each of the engaging pins 148 is secured to the base 132 by screwing or press fitting into openings 130-6 which are shown in more detail in FIGS. 27 and 28, or by welding or in any suitable manner, and extends outward from a lower surface 150 of the base 132 that is opposite to the surface 144 of the base 132. Each of the engaging pins 148 includes a narrow shaft portion 152 and a wide diameter top portion 154 defining an edge 156. The diameter of the wide diameter top portion 154 is greater than the width of the narrower retention portion 62. As discussed in more detail below, during mounting of the second BUC assembly 44 to the hub baseplate 40, each of the engaging pins 148 is received into a respective elongated opening 58 in the hub baseplate 40. As discussed in more detail below, an engaging pin 148 is initially received into the wider alignment portion 60 of the elongated opening 58, and then moved into the narrower retention portion 62 when the second BUC assembly 44 is moved in the direction toward the narrower retention portion 62. The carrier chassis 130 further includes fasteners 158, such as screws, which pass through the base 132 via openings 130-7 as shown in more detail in FIGS. 27 and 28 and in this example, are rotatably secured to the base 132 to rotate about their own respective longitudinal axis. Each of the fasteners 158 is received into a respective opening 54 to removably secure the carrier chassis 130, and therefore the entire second BUC assembly 44, to the base 46 of the hub baseplate 40 as discussed in more detail below. Also, each of the fasteners 158 also allow for some movement or play between the base 92 and the openings 54. For instance, a fastener 158 can allow for movement of the base 92 at or about ⅛ of an inch in any direction with respect to opening 54 to which the fastener 158 is going to mate, to provide the fine adjustment once the engaging pins 148 of the carrier chassis 130 slide through the elongated openings 58 as discussed herein. Naturally, the hub baseplate 40 can alternatively be configured to include engaging pins 148, and the carrier chassis 130 can alternatively be configured to include the elongated openings 58, or the hub baseplate 40 and the carrier chassis 130 can each be configured to include a combination of elongated openings 58 and engaging pins 148 that mate with opposing engaging pins 148 and elongated openings 58 in the manner described herein.

As shown in more detail in FIGS. 69-81, cross bar and handle assembly 126 includes a plurality of cross bars 126-1 that are mounted to the carrier chassis 130 by fasteners 126-11 such as screws, shoulder screws, bolts, rivets, welding or any other suitable type of fastener that is received into openings 126-12 and openings 130-6 as understood in the art. The cross bar and handle assembly 126 further includes a cross bar handle assembly 126-2 including a cross bar handle support 126-21. Each cross bar handle support 126-21 is coupled to a cross bar 126-1 via fasteners 126-22 such as screws, shoulder screws, bolts, rivets, welding or any other suitable type of fastener as understood in the art that pass through openings 126-211 in the cross bar handle support 126-21 and into openings 126-13 in the cross bars 126-1. Each cross bar handle assembly 126-2 further includes a cross bar handle 126-23 that is coupled to a respective cross bar handle support 126-21 via fasteners 126-24 such as screws, shoulder screws, bolts, rivets, welding or any other suitable type of fastener as understood in the art that pass into openings 126-231 in cross bar handle 126-23 and into openings 126-212 in the cross bar handle support 126-21.

Figure 4:
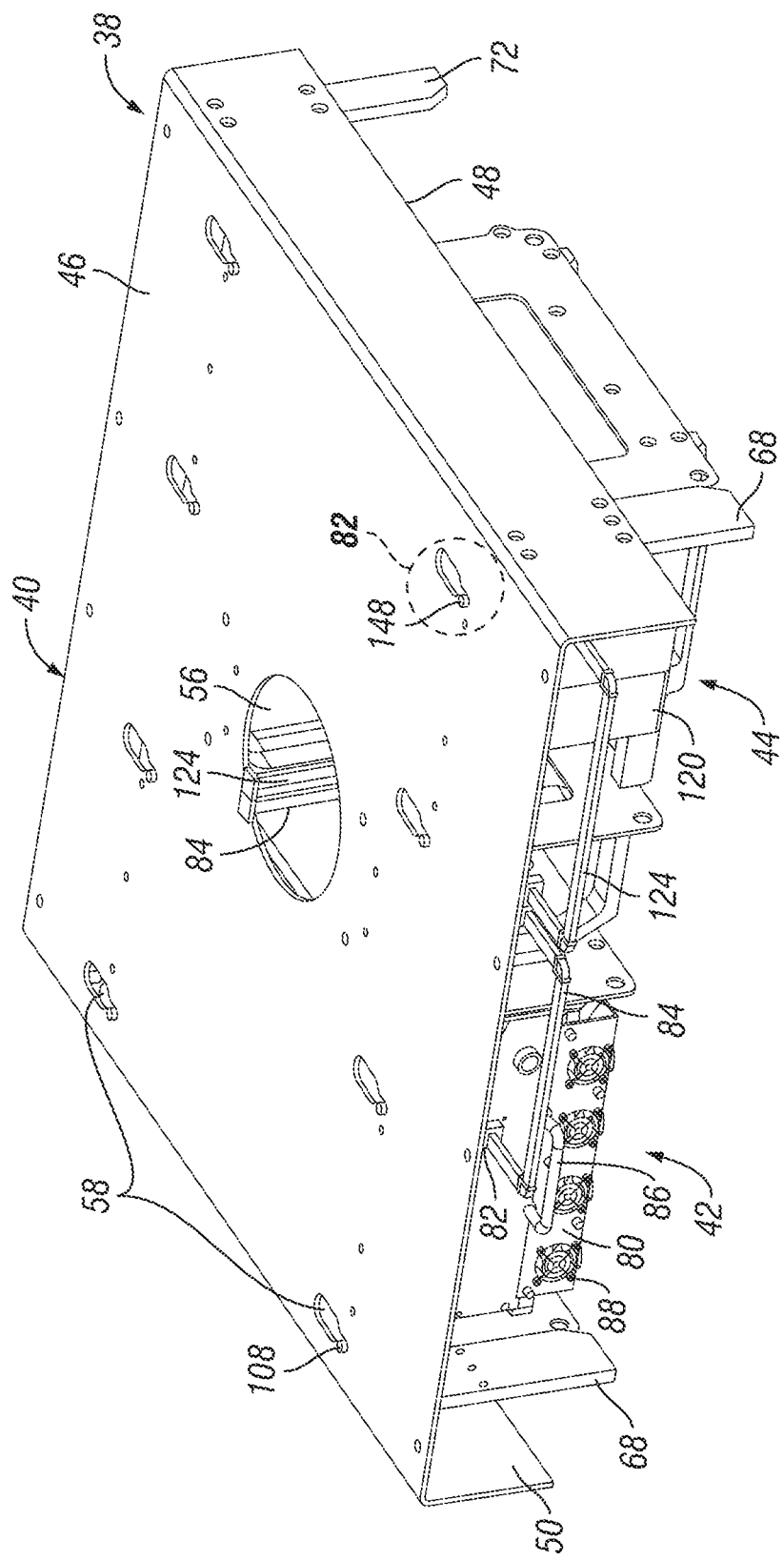
FIG. 4 is a bottom perspective view of the antenna module mounting apparatus shown in FIG. 2 separate from the antenna feed hub.
Figure 5:
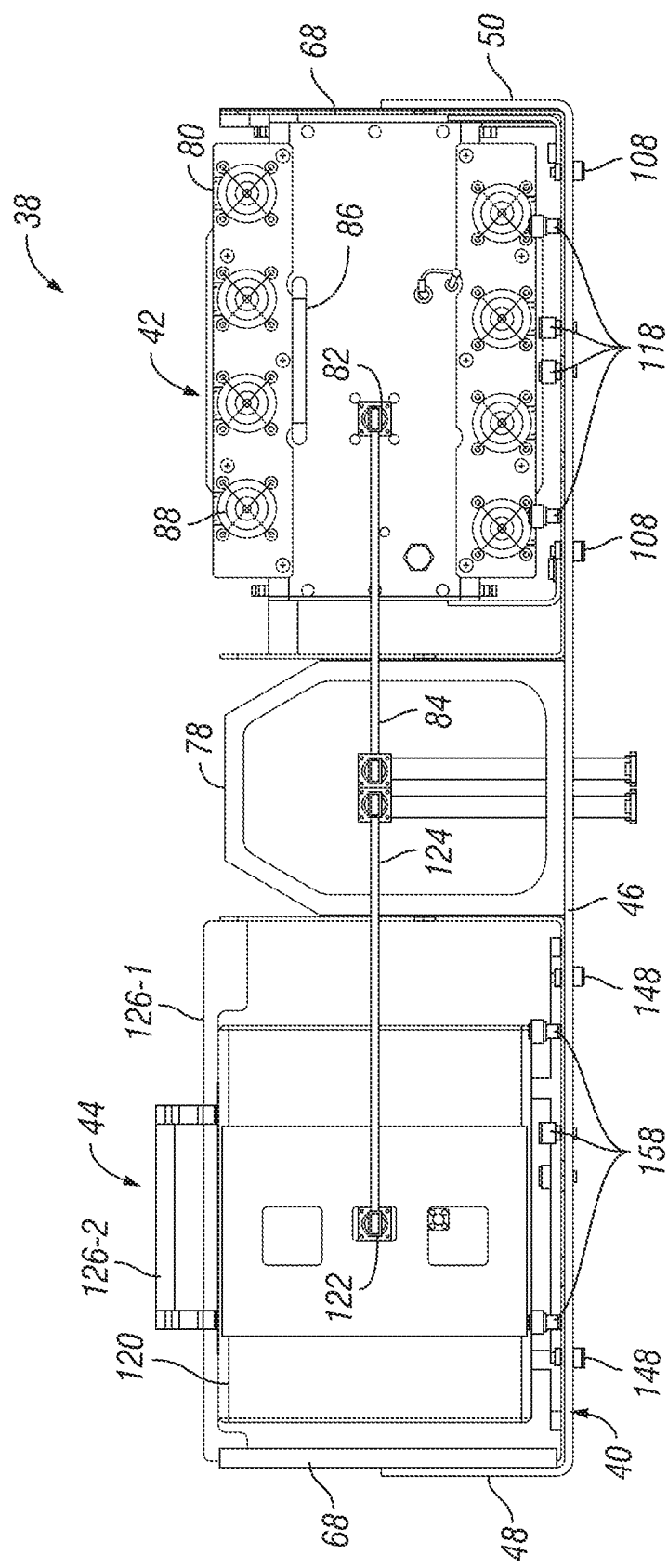
FIG. 5 is a front elevational view of the antenna module mounting apparatus shown in FIG. 2 separate from the antenna feed hub.
Figure 6:
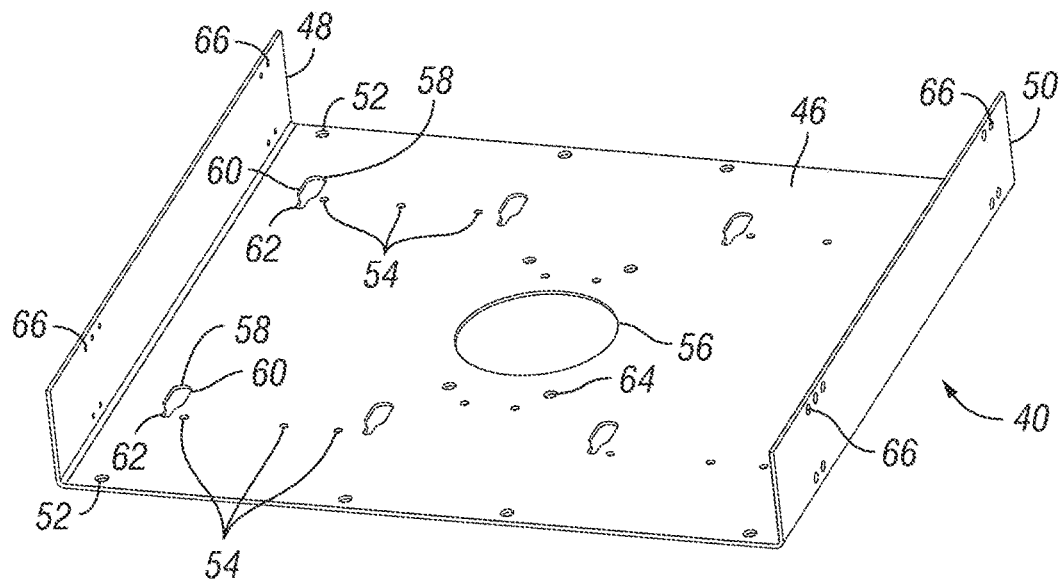
FIG. 6 is a top perspective view of an example of a hub baseplate attached to the antenna feed hub shown in FIG. 2 and to which the antenna module mounting apparatus is mounted.
Figure 7:
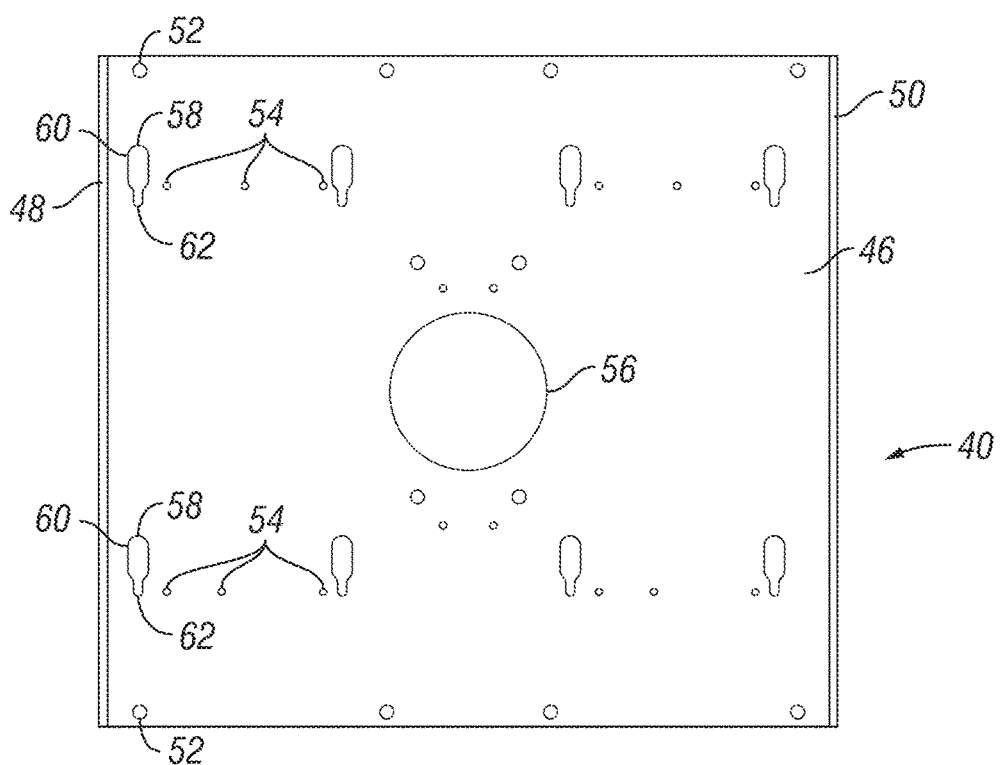
FIG. 7 is a top plan view of the hub baseplate shown in FIG. 6.
Figure 58:
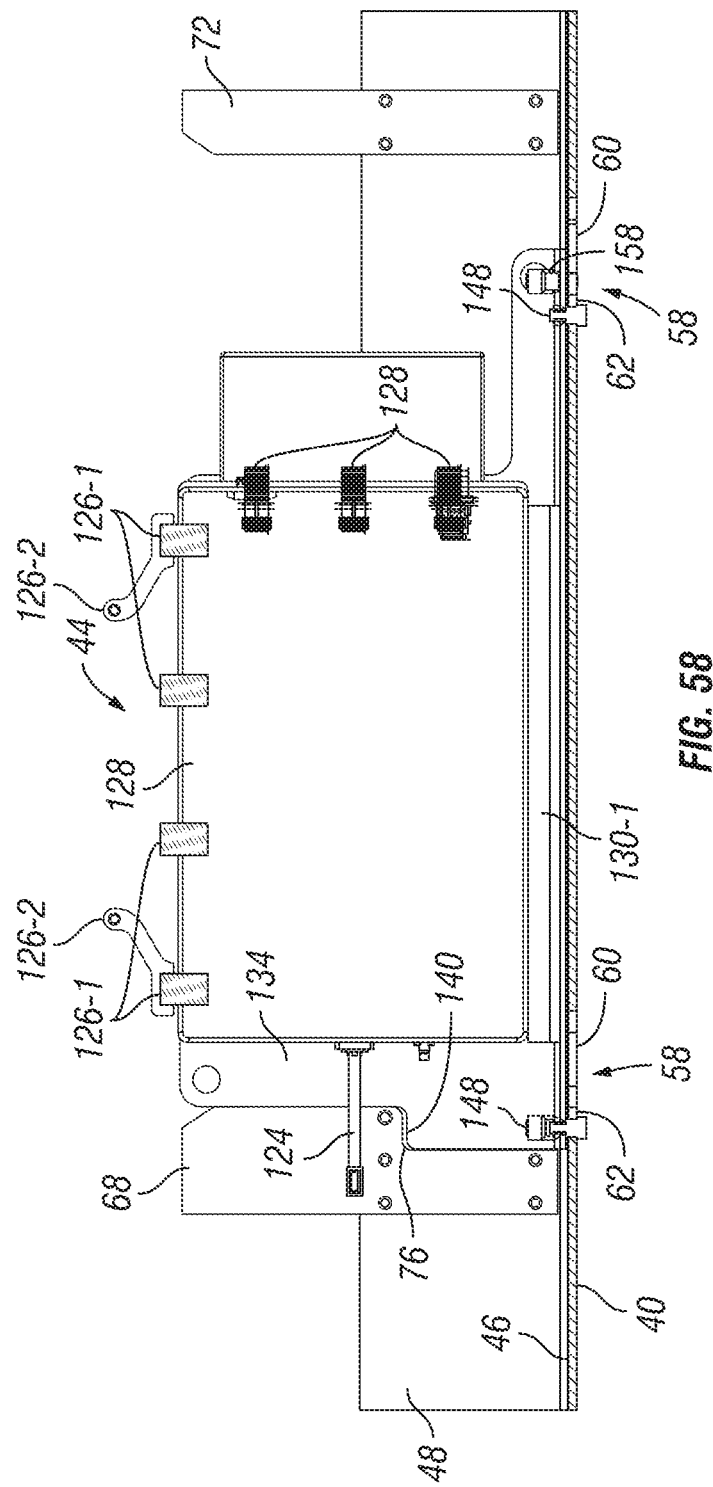
FIG. 58 is a cross-sectional view taken along lines 58-58 in FIG. 3 showing the second BUC assembly mounted to the hub baseplate of the antenna feed module mounting apparatus.
Figure 59:
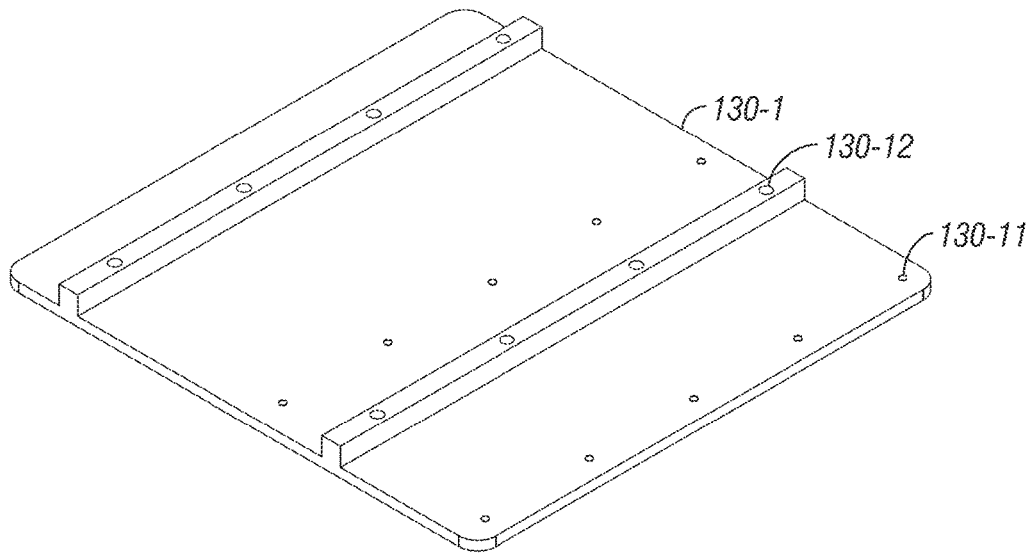
FIG. 59 is a top perspective view of an example of a lifting plate included in the second BUC assembly.
Figure 60:
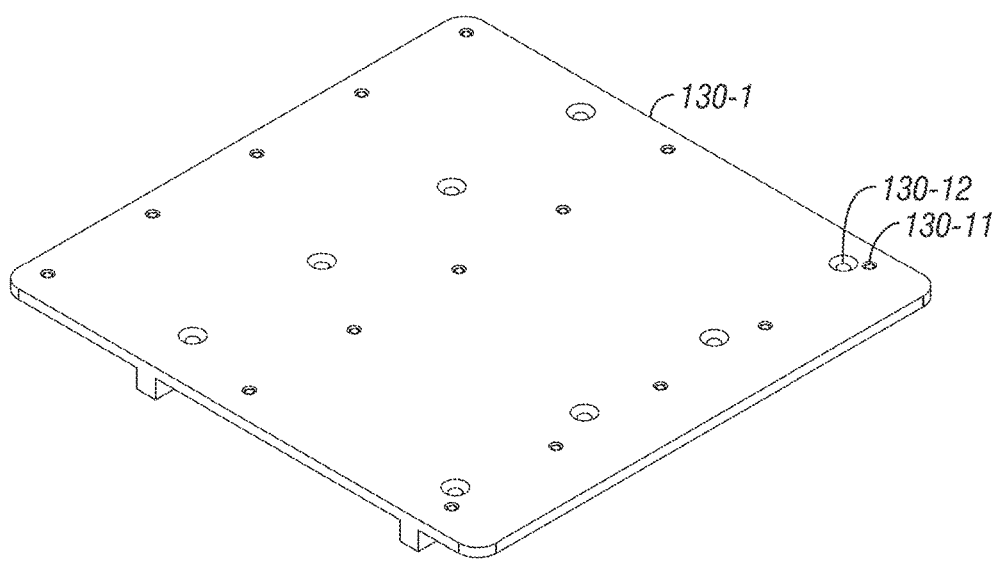
FIG. 60 is a bottom perspective view of an example of a lifting plate included in the second BUC assembly.
Figure 61:
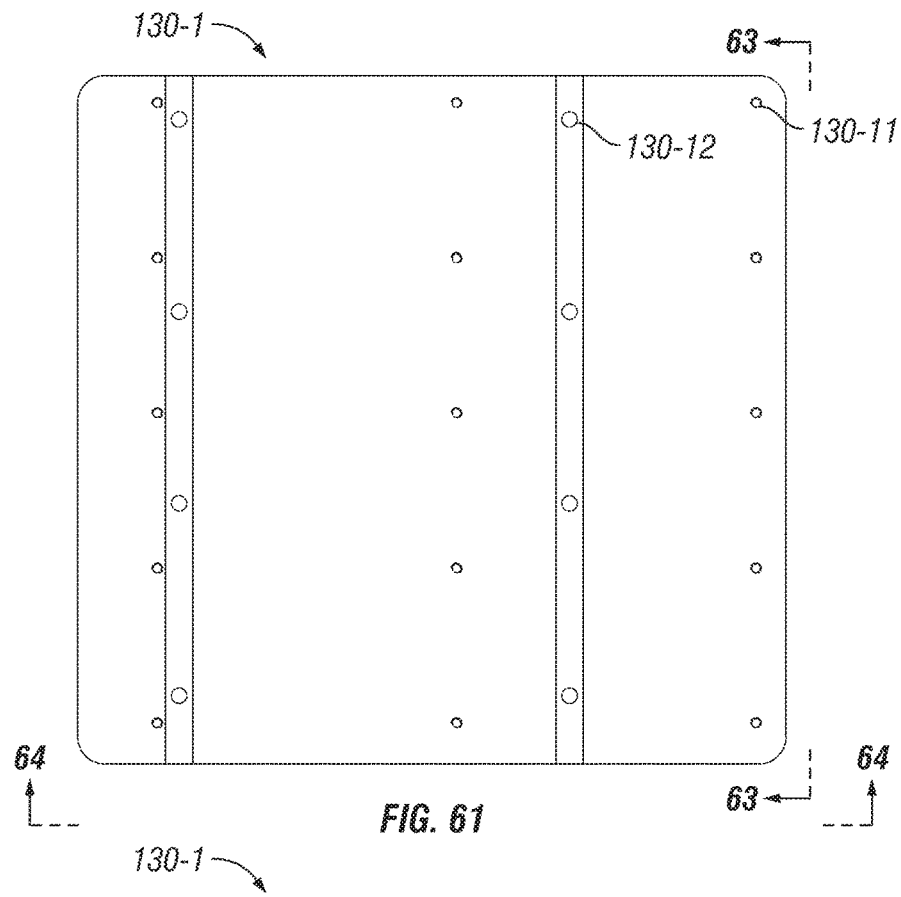
FIG. 61 is a top plan view of the lifting plate as shown in FIG. 59.
Figure 62:
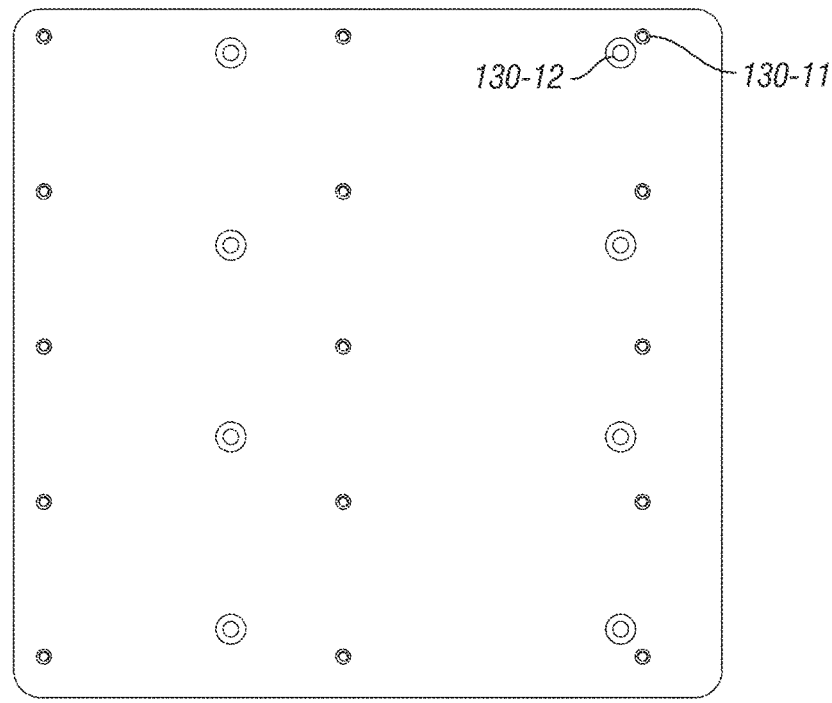
FIG. 62 is a bottom plan view of the lifting plate as shown in FIG. 60.
Figure 63:
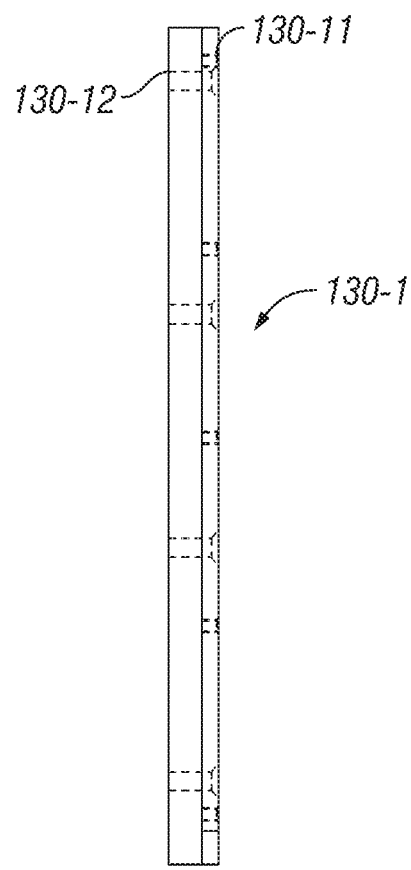
FIG. 63 is a side view of the lifting plate taken along lines 63-63 in FIG. 61.
Figure 64:
FIG. 64 is a front view of the lifting plate taken along lines 64-64 in FIG. 61.
Figure 65:
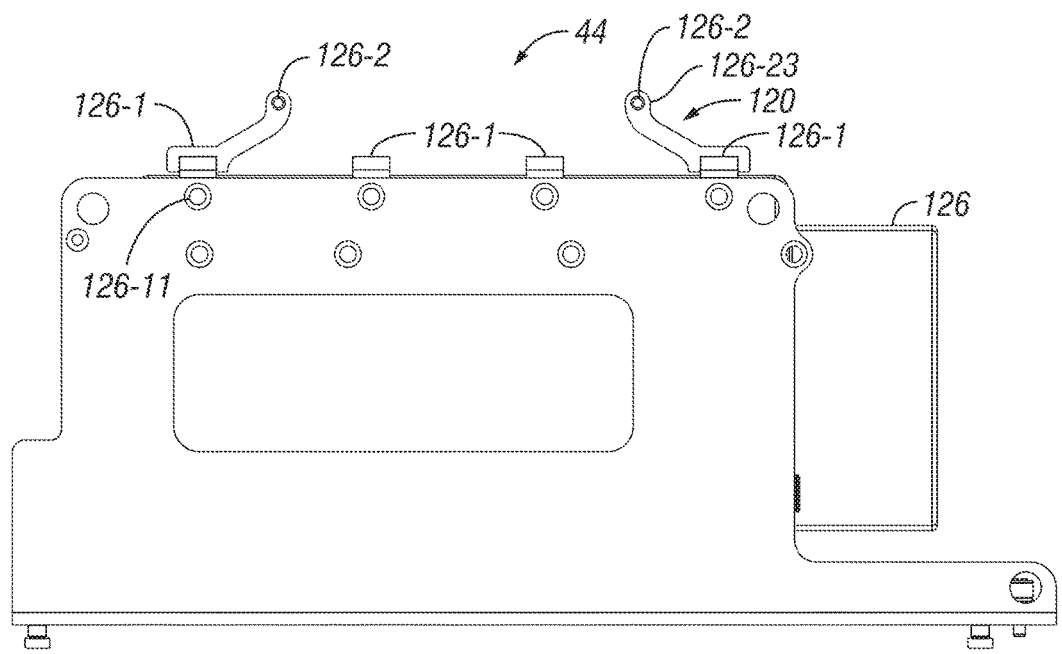
FIG. 65 is a side view of the second BUC assembly.
Figure 66:
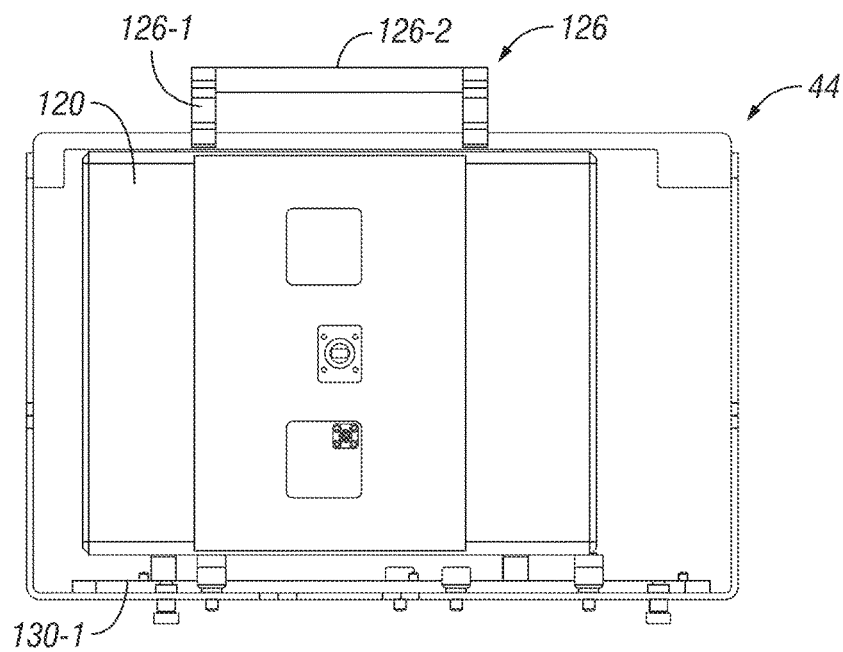
FIG. 66 is a front view of the second BUC assembly.
Figure 67:
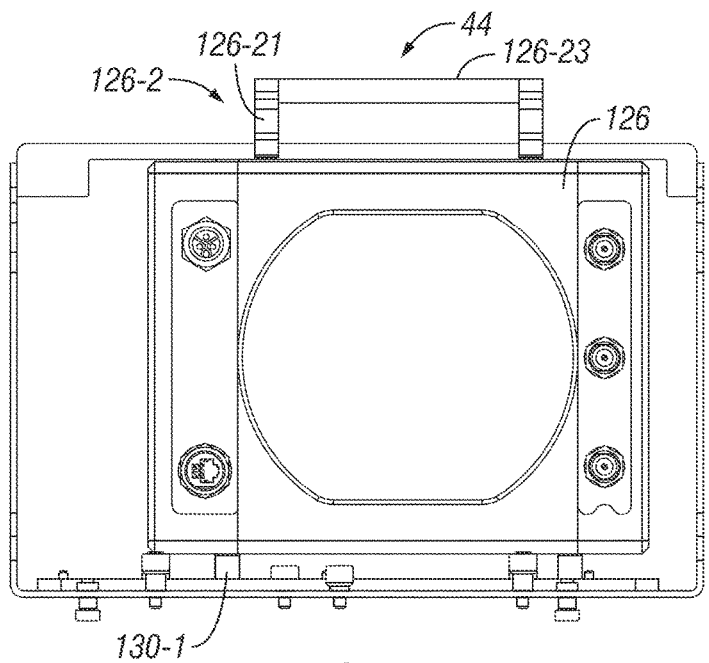
FIG. 67 is a rear view of the second BUC assembly.
Figure 68:
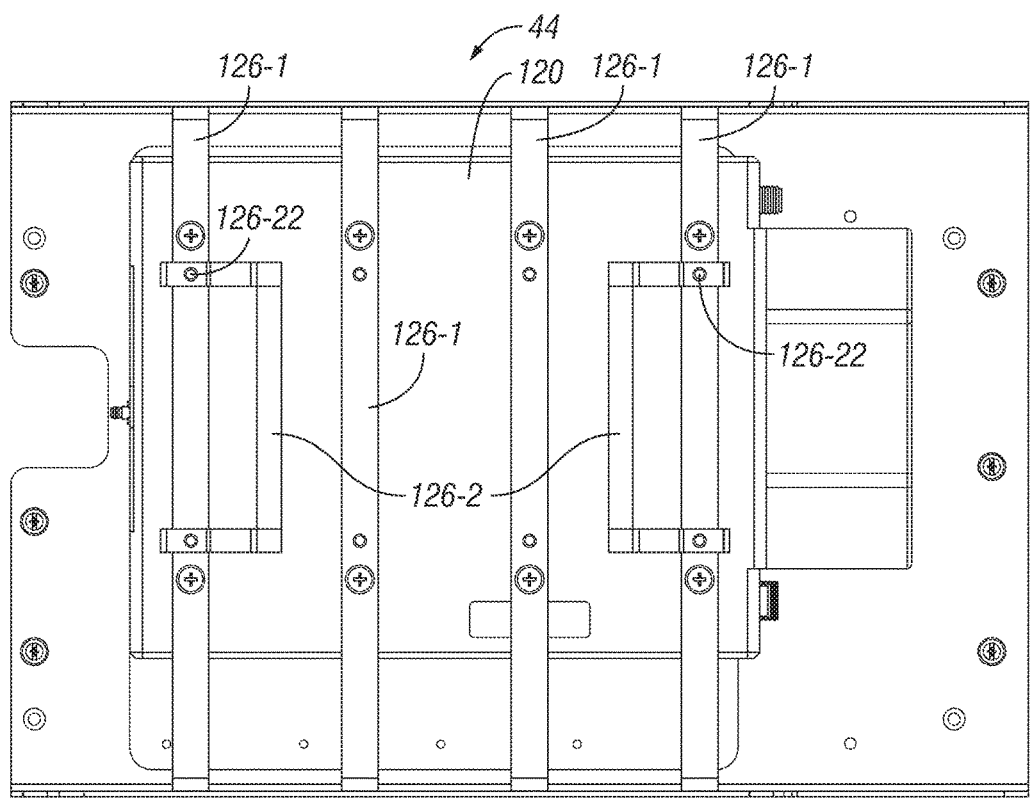
FIG. 68 is a top view of the second BUC assembly.
Figure 69:
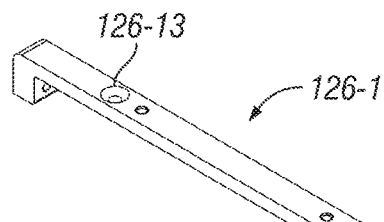
FIG. 69 is a top perspective view of a cross bar included in the second BUC assembly.
Figure 70:
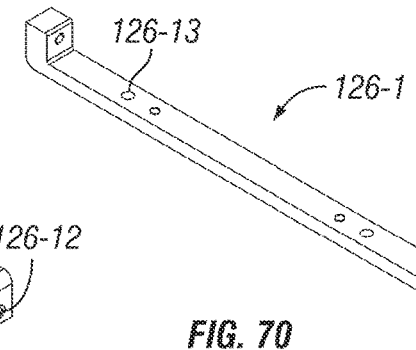
FIG. 70 is a bottom perspective view of a cross bar included in the second BUC assembly.
Figure 71:
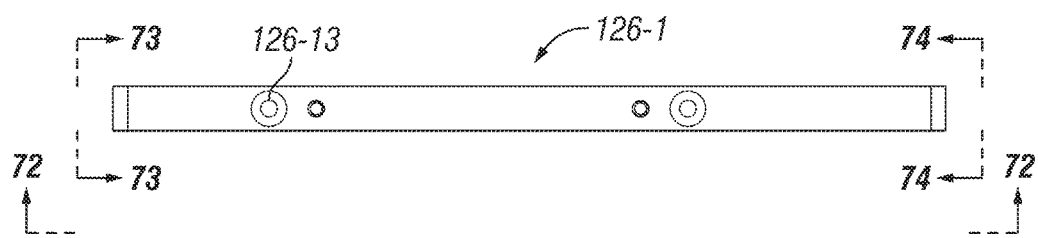
FIG. 71 is a top plan view of the cross bar as shown in FIG. 69.
Figure 72:
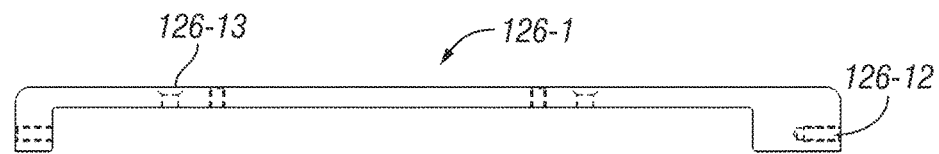
FIG. 72 is a side elevational view of the cross bar as taken along lines 72-72 in FIG. 71.
Figure 73:
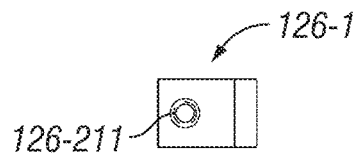
FIG. 73 is an end view of the cross bar as taken along lines 73-73 in FIG. 71.
Figure 74:
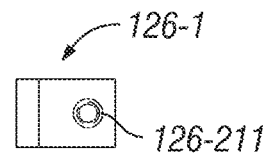
FIG. 74 is an end view of the cross bar as taken along lines 74-74 in FIG. 71.
Figure 75:
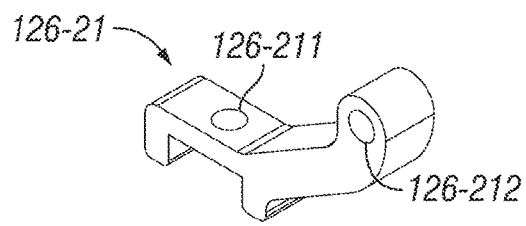
FIG. 75 is a perspective view of a cross bar handle support included in the second BUC assembly.
Figure 76:
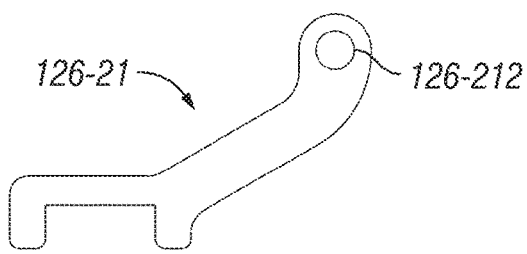
FIG. 76 is a side view of the cross bar handle support as shown in FIG. 75.
Figure 77:
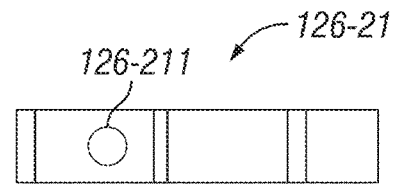
FIG. 77 is a top view of the cross bar handle support as shown in FIG. 75.
Figure 78:
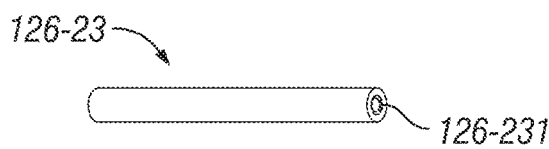
FIG. 78 is a perspective view of a cross bar handle included in the second BUC assembly.
Figure 79:
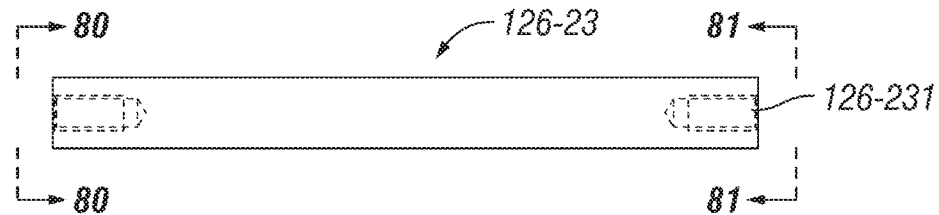
FIG. 79 is a front view of the cross bar handle as shown in FIG. 78.

As can be appreciated from the above description and, for example, from FIGS. 4, 58 and 82, when the first BUC assembly 42 and the second BUC assembly 44 are mounted to the base 46 of the hub baseplate 40, the engaging pins 108 of the first BUC assembly 42 and the engaging pins 148 of the second BUC assembly 44 are each positioned within the narrower retention portion 62 of a respective elongated opening 58. Also, the fasteners 118 of the first BUC assembly 42 and the fasteners 158 of the second BUC assembly 44 are each tightened into a respective opening 54 in the hub baseplate 40 to secure the first BUC assembly 42 and the second BUC assembly 44 to the base 46 of the hub baseplate 40. The fasteners 118 and 158 can initially by tightened by hand to initially secure the first BUC assembly 42 and the second BUC assembly 44 to the base 46 of the hub baseplate 40 while the engaging pins 108 and 148 are holding the first BUC assembly 42 and the second BUC assembly 44 to the base 46 of the hub baseplate 40, and then the fasteners 118 and 158 can be further tightened with a tool such as a screwdriver, bolt driver, nut driver or any other suitable tool. Furthermore, in this example, the notch 102 defined by the second wall 96 of the carrier chassis 90 of the first BUC assembly 42 contacts and engages with the notch 76 in the stop/guide bar 68 that is connected to the second wall 50 of the hub baseplate 40. Also in this example, the notch 134 of the first wall 134 of the carrier chassis 130 of the second BUC assembly 44 contacts and engages with the notch 76 in the stop/guide bar 68 that is connected to the first wall 48 of the hub baseplate 40. It should be noted that the notches 76 in the stop/guide bar 68 engage the notch 102 defined by the second wall 96 of the carrier chassis 90 and the notch 140 define by the first wall 134 of the carrier chassis 130 to maintain the engaging pins 108 and 148 at a depth within the elongated openings 58 so that the engaging pins 108 and 148 can be slid along the elongated openings 58 with the wide diameter top portions 114 and 154 clearing the outer surface of the base 46 of the hub baseplate 40 so that the wide diameter top portions 114 and 154 do not jam within the narrower retention portion 62 of the elongated openings 58 while being slid.

If it becomes necessary or desirable to replace the first BUC assembly 42, the second BUC assembly 44, or both, the following exemplary process can be performed. For purposes of this discussion, the process will be described with regard to the second BUC assembly 44. However, the same process is performed with regard to the first BUC assembly 42.

To remove the second BUC assembly 44 from the hub baseplate 40, the technician can rotate the antenna dish assembly 16 so that the yoke arm A closest to the second BUC assembly 44 is in the lower position and extends horizontally or substantially horizontally with respect to the horizon as understood in the art. A technician can use a screwdriver, nut driver, bolt driver or any other suitable type of tool to loosen the fasteners 158 from their respective openings 54. Because the fasteners 158 in this configuration are rotatably secured to the base 132, the fasteners 158 remain secured to the base 132 when the fasteners 132 are no longer secured into their respective openings 54. When the fasteners 132 no longer secure the second BUC assembly 44 to the hub baseplate 40, the engagement of the engaging pins 148 with the retention portion 62 of their respective elongated openings 58 in the hub baseplate 40 support and retain the second BUC assembly 44 to the hub baseplate 40. That is, the edge 156 of each respective engaging pin 148 contacts the base 46 of the hub baseplate 40 to support and retain the second BUC assembly 44 to the hub baseplate 40.

Figure 83:
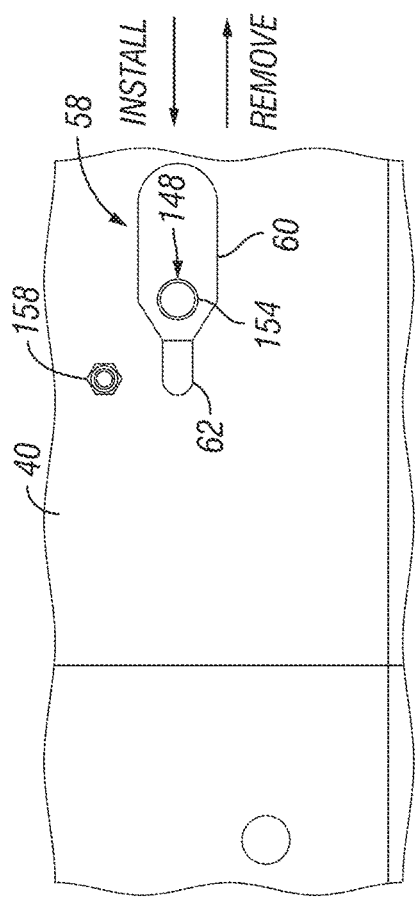
FIG. 83 is a detailed bottom plan view of the antenna feed module mounting apparatus illustrating the engaging pin of the second BUC assembly moved into the wider alignment portion of the elongated opening in the hub baseplate as shown in FIG. 82.
Figure 84:
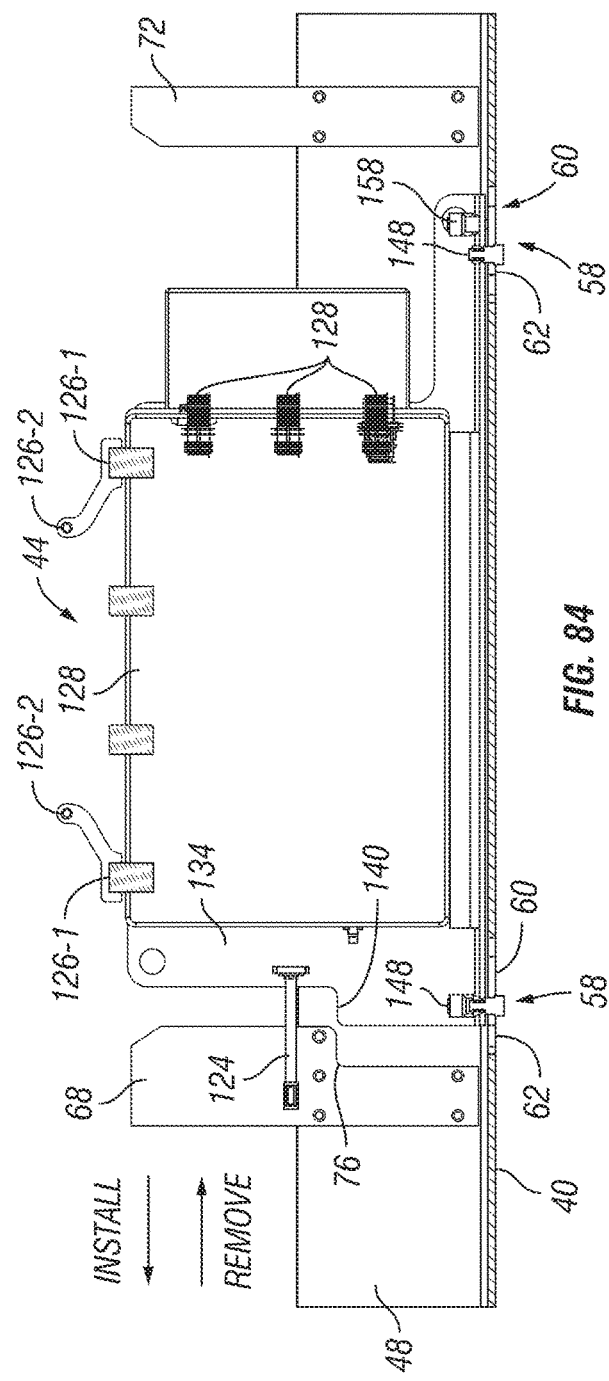
FIG. 84 is a cross-sectional view showing the second BUC assembly beginning to be removed from the hub baseplate of the antenna feed module mounting apparatus.
Figure 85:
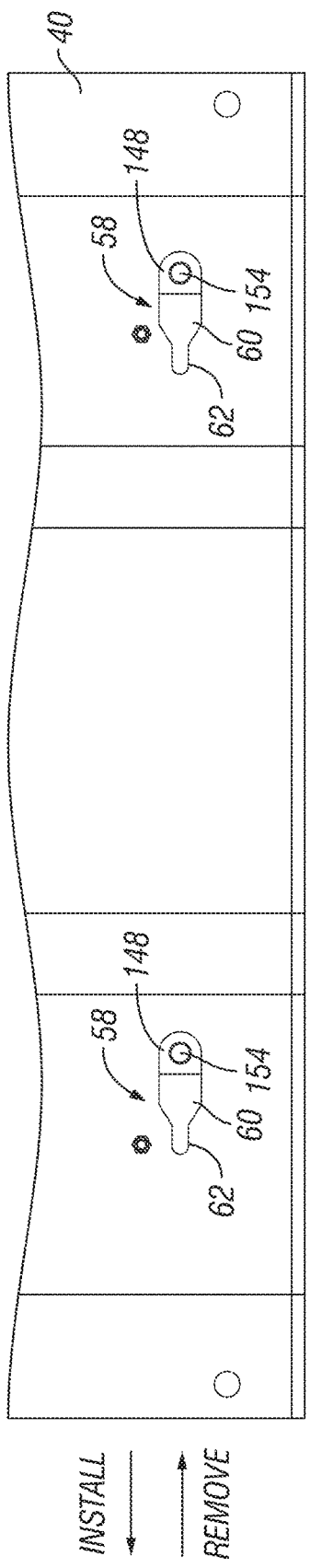
FIG. 85 is a sectional bottom plan view of the antenna feed module mounting apparatus further illustrating engaging pins of the second BUC assembly moved into the wider alignment portion of their respective elongated opening in the hub baseplate as shown in FIG. 82.
Figure 86:
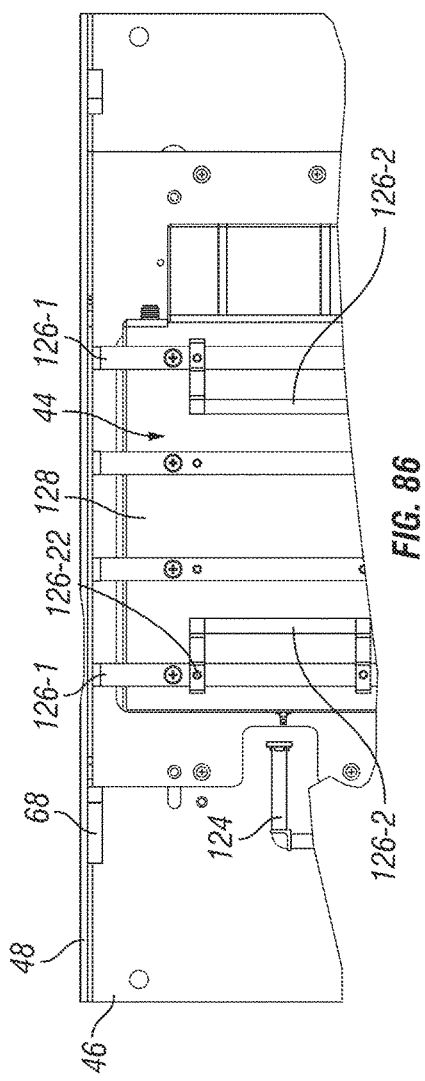
FIG. 86 is a top plan sectional view showing the second BUC assembly beginning to be removed from the hub baseplate of the antenna feed module mounting apparatus.

The technician can the move the second BUC assembly 44 in the direction indicated by the arrows in the "remove" direction as shown, for example, in FIGS. 83-85. By doing this, each respective engaging pin 148 slides along its respective elongated opening 58 until the engaging pins 148 are positioned within the wider alignment portion 60 of their respective elongated openings 58 as shown. It should also be noted that the engagement of the notch 76 in the stop/guide bar 68 that is connected to the first wall 48 of the hub baseplate 40 with the notch 134 of the first wall 134 of the carrier chassis 130 of the second BUC assembly 44 prevents the second BUC assembly 44 from being moved in a direction perpendicularly away from the hub baseplate 40. This engagement thus prevents the technician from trying to remove the second BUC assembly 44 from the hub baseplate 40 until there is sufficient clearance between any of the components on the second BUC assembly 44 and the waveguide 124 as shown, for example, in FIG. 86, thus preventing damage to the waveguide 124 by such components on the second BUC assembly 44. Furthermore, the guide plates 78 can act as a parallel wall along which the carrier chassis 130 travels, while also protecting the waveguides 84 and 124.

Figure 87:
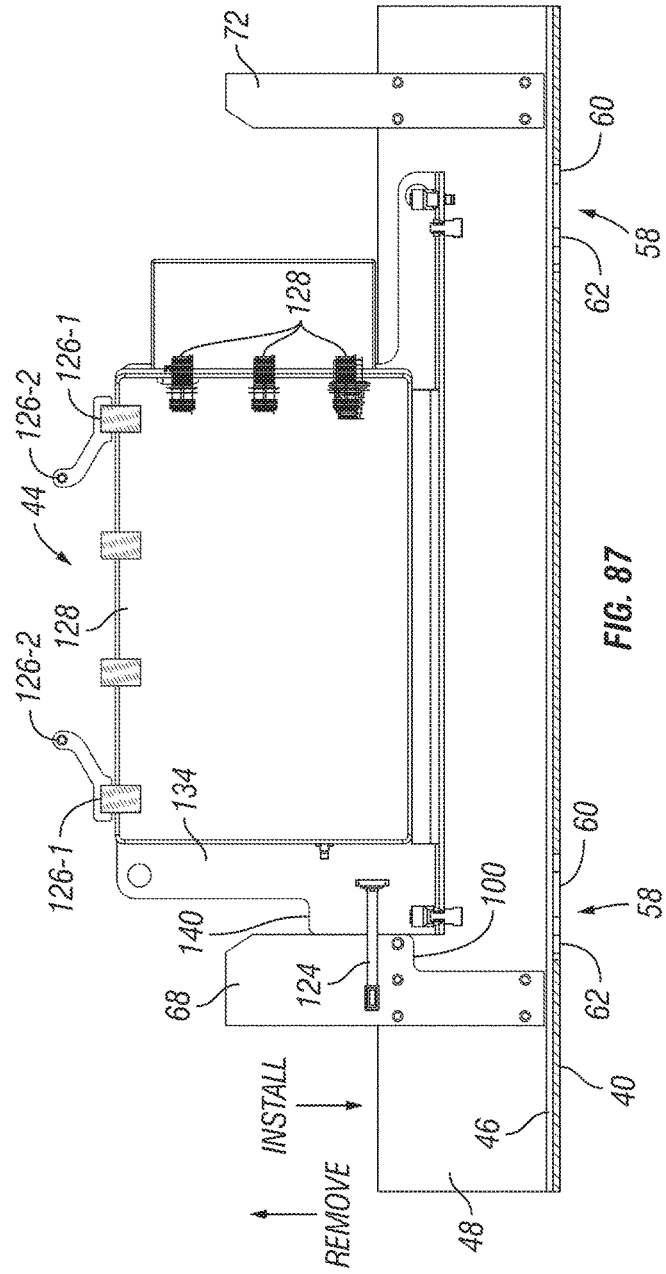
FIG. 87 is a cross-sectional view showing the second BUC assembly beginning to be lifted out of the hub baseplate of the antenna feed module mounting apparatus.
Figure 88:
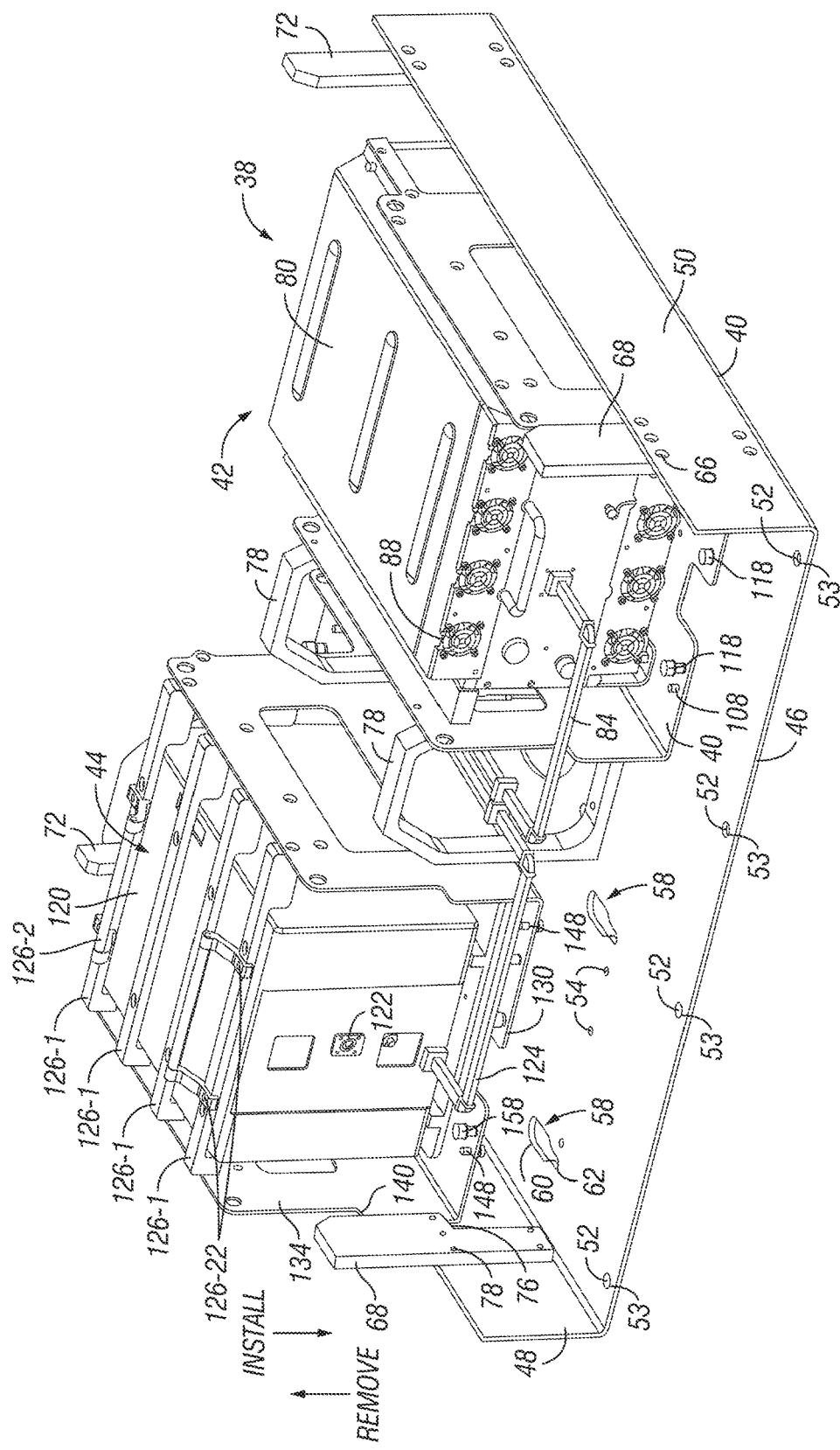
FIG. 88 is a top perspective view of the antenna module mounting apparatus, rotated 90 degrees to the left of the top perspective view of the antenna module mounting apparatus shown in FIG. 3, showing the second BUC assembly beginning to be lifted out of the hub baseplate of the antenna feed module mounting apparatus.

Once the second BUC assembly 44 has been moved a sufficient distance in the direction of arrow "remove" so that the notch 76 no longer prevents the second BUC assembly 44 from being moved in a direction perpendicularly away from the hub baseplate 40, the technician can move the second BUC assembly 44 in the direction of arrow "remove" in FIGS. 87 and 88, which is a direction perpendicularly or substantially perpendicularly away from the hub baseplate 40. In this example, the notch 76 engages or interferes with the notch 134 to prevent the second BUC assembly 44 from being moved in a direction perpendicularly away from the hub baseplate 40 until the second BUC assembly 44 has been moved at or about 1 inch in the direction of arrow "remove" from the mounting position at which the fasteners 158 secure the second BUC assembly 44 to the hub baseplate 40. The technician can thus remove the second BUC assembly 44 from the hub baseplate 40. The technician can then, if desired, rest the second BUC assembly 44 on a yoke arm of the antenna dish assembly 16, and ultimately remove the second BUC assembly 44 from the gateway antenna 10.

As mentioned above, a technician can perform a similar process to remove the first BUC assembly 42 from the hub baseplate 40. For example, the technician can rotate the antenna dish assembly 16 by 180 degrees so that the yoke arm A closest to the first BUC assembly 42 is in the lower position and extends horizontally or substantially horizontally with respect to the horizon as understood in the art. The technician can use a screwdriver, nut driver, bolt driver or any other suitable type of tool to loosen the fasteners 118 from their respective openings 54. Because the fasteners 118 in this configuration are rotatably secured to the base 92, the fasteners 118 remain secured to the base 92 when the fasteners 92 are no longer secured into their respective openings 54. When the fasteners 92 no longer secure the first BUC assembly 42 to the hub baseplate 40, the engagement of the engaging pins 108 with the retention portion 62 of their respective elongated openings 58 in the hub baseplate 40 support and retain the first BUC assembly 42 to the hub baseplate 40. That is, the edge 116 of each respective engaging pin 108 contacts the base 46 of the hub baseplate 40 to support and retain the first BUC assembly 42 to the hub baseplate 40.

The technician can the move the first BUC assembly 42 in the direction similar to that indicated by the arrows in the "remove" direction as shown, for example, in FIGS. 83-85 with regard to the second BUC assembly 44. By doing this, each respective engaging pin 108 slides along its respective elongated opening 58 until the engaging pins 108 are positioned within the wider alignment portion 60 of their respective elongated openings 58 as shown. It should also be noted that the engagement of the notch 76 in the stop/guide bar 68 that is connected to the second wall 50 of the hub baseplate 40 with the notch 102 of the second wall 96 of the carrier chassis 90 of the first BUC assembly 42 prevents the first BUC assembly 42 from being moved in a direction perpendicularly away from the hub baseplate 40. As with the second BUC assembly 44, this engagement thus prevents the technician from trying to remove the first BUC assembly 42 from the hub baseplate 40 until there is sufficient clearance between any of the components on the first BUC assembly 42 and the waveguide 84, thus preventing damage to the waveguide 84 by such components on the first BUC assembly 42. Furthermore, the guide plates 78 can act as a parallel wall along which the carrier chassis 90 travels, while also protecting the waveguides 84 and 124.

Figure 89:
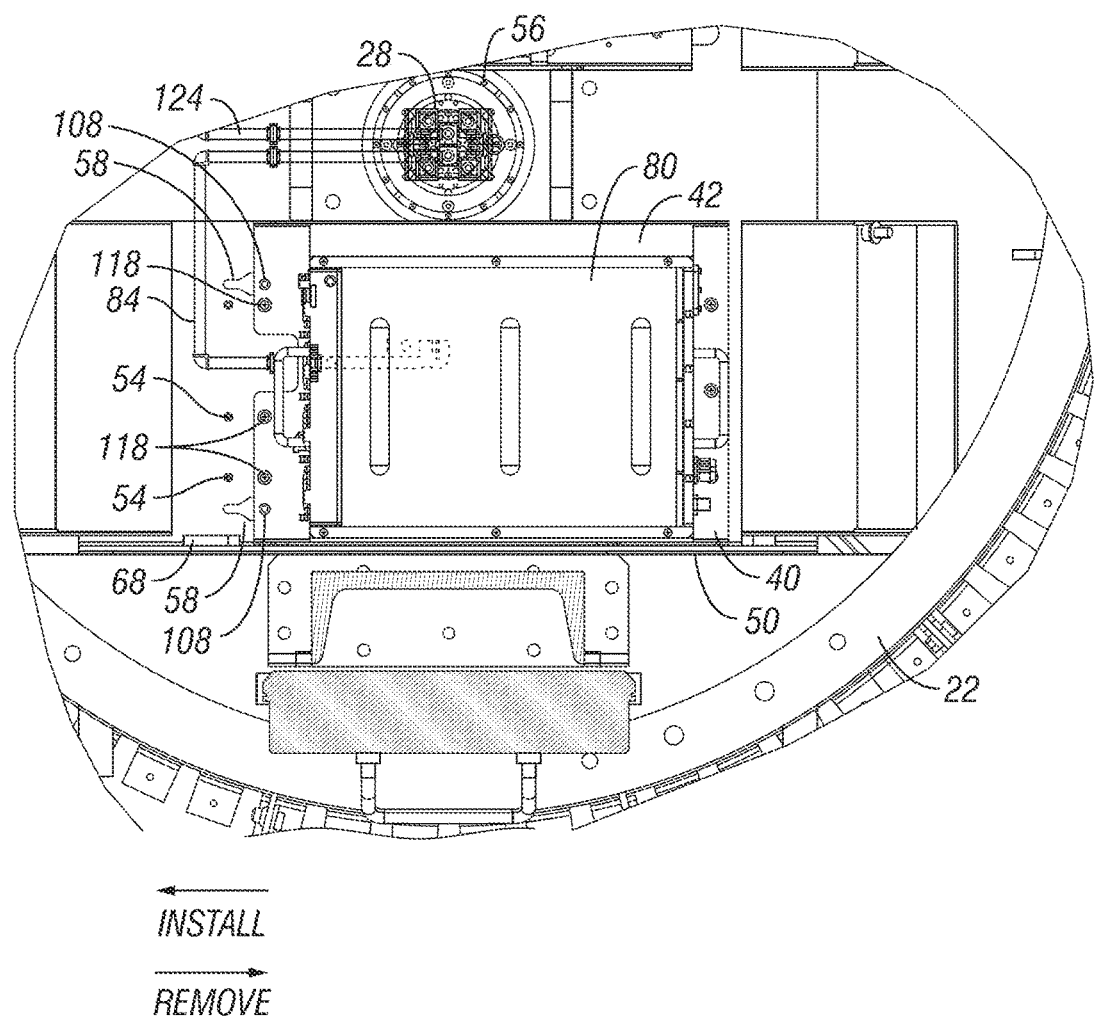
FIG. 89 is a front view of a section of the antenna feed hub of the antenna dish assembly with the first BUC assembly lifted out of the hub baseplate of the antenna feed module mounting apparatus.
Figure 91:
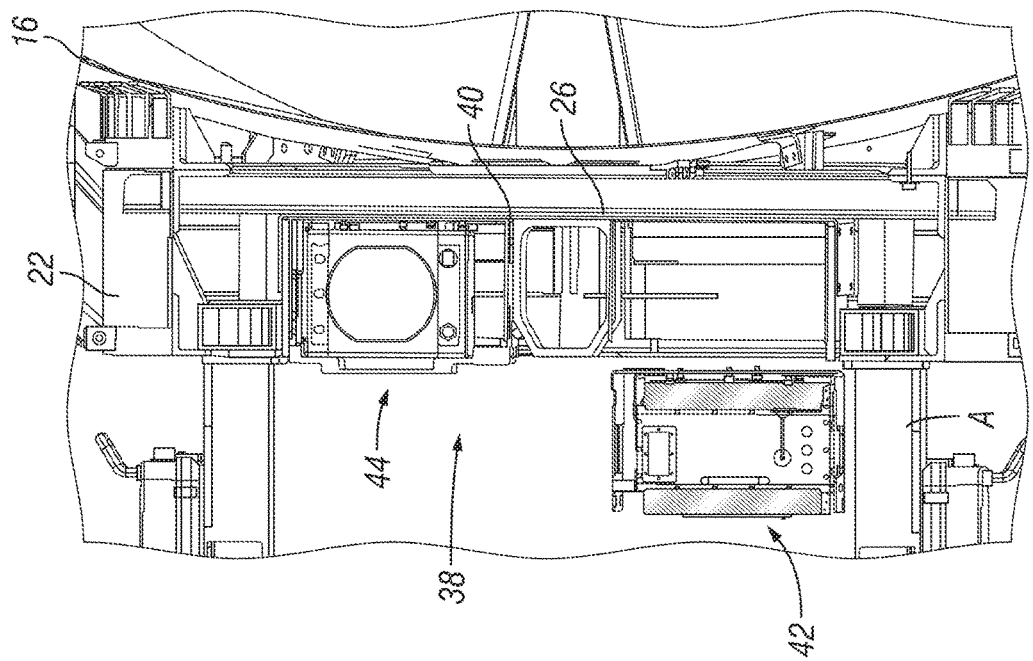
FIG. 91 is a side elevational view of a section of the antenna dish assembly with the first BUC assembly resting on a yoke arm of the antenna dish assembly.
Figure 90:
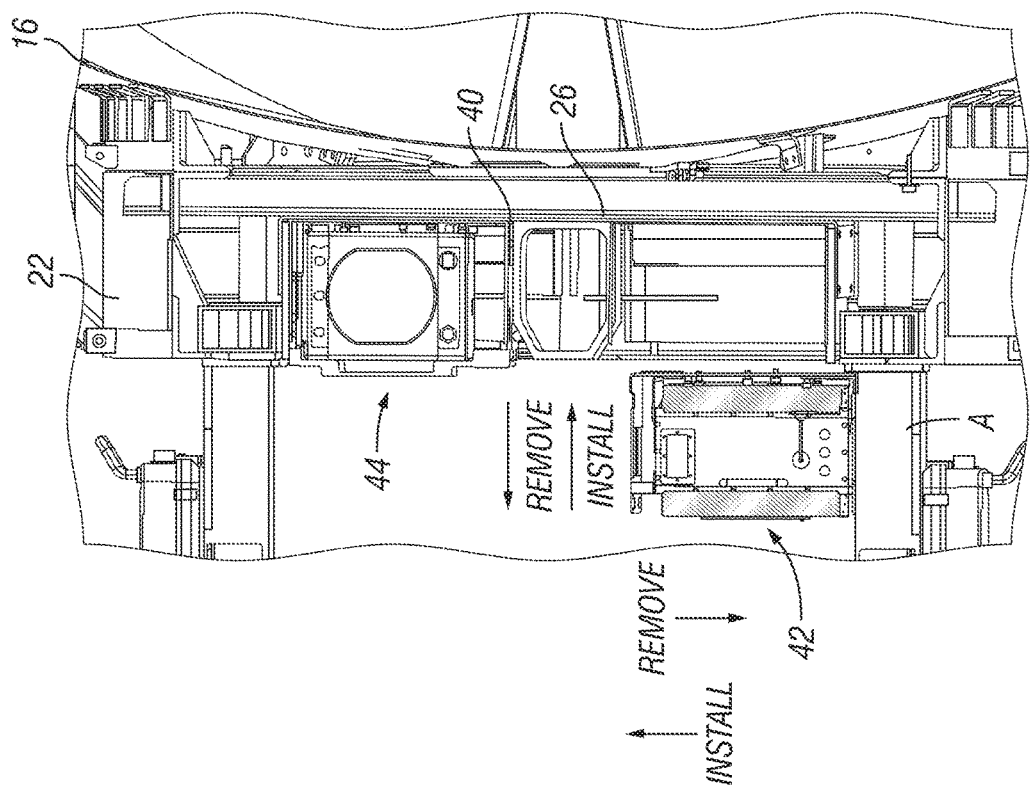
FIG. 90 is a side elevational view of a section of the antenna dish assembly with the first BUC assembly lifted out of the hub baseplate of the antenna feed module mounting apparatus and positioned above a yoke arm of the antenna dish assembly.

Once the first BUC assembly 42 has been moved a sufficient distance in the direction of arrow "remove" so that the notch 76 no longer prevents the first BUC assembly 42 from being moved in a direction perpendicularly away from the hub baseplate 40, the technician can move the first BUC assembly 42 in the direction of arrow "remove" in a manner similar to that shown in in FIGS. 87 and 88 for the second BUC assembly 44, which is a direction perpendicularly or substantially perpendicularly away from the hub baseplate 40. In this example, the notch 76 engages or interferes with the notch 102 to prevent the first BUC assembly 42 from being moved in a direction perpendicularly away from the hub baseplate 40 until the first BUC assembly 42 has been moved at or about 1 inch in the direction of arrow "remove" from the mounting position at which the fasteners 118 secure the first BUC assembly 42 to the hub baseplate 40. The technician can thus remove the first BUC assembly 42 from the hub baseplate 40 as shown, for example, in FIGS. 89 and 90. Then, if desired, the technician can rest the first BUC assembly 42 on a yoke arm A of the antenna dish assembly 16, as shown in FIG. 91. The technician can then ultimately remove the first BUC assembly 42 from the gateway antenna 10.

When a first BUC assembly 42 and a second BUC assembly 44 is being installed in the antenna dish assembly 16, a technician can perform operations in reverse of those discussed above. For example, when installing a second BUC assembly 44 in the antenna dish assembly 16, the technician can rotate the antenna dish assembly 16 so that the yoke arm A closest to the second BUC assembly 44 is in the lower position and extends horizontally or substantially horizontally with respect to the horizon as understood in the art. The technician can rest the second BUC assembly 44 on a yoke arm A of the antenna dish assembly 16, in a manner similar to that shown in FIG. 91 for the first BUC assembly 42, before attempting to secure the second BUC assembly 44 to the hub baseplate 40. In this example, the second BUC assembly 44 is lifted at or about 1.17 inches above the yoke arm A before being slid into engagement with the hub baseplate 40. However, the lifting distance can be any suitable distance to accommodate the dimensions of the antenna dish assembly 16, the antenna module mounting system 38 and so on. To secure the second BUC assembly 44 to the hub baseplate 40, the technician can align the second BUC assembly 44 with the hub baseplate 40 and move the second BUC assembly 44 in a direction of arrow "install" in FIGS. 87 and 88 so that the engaging pins 148 are positioned within the wider alignment portion 60 of their respective elongated openings 58 as shown, for example, in FIGS. 83-85.

The technician can then move the second BUC assembly 44 in the direction indicated by the arrows in the "install" direction as shown, for example, in FIGS. 83-85. By doing this, each respective engaging pin 148 slides along its respective elongated opening 58 until the engaging pins 148 are positioned within the narrower retention portion of their respective elongated openings 58 as shown, for example, in FIGS. 4, 58 and 82. In doing so, the second BUC assembly 44 can be within at or about 0.02 inches, or any suitable distance, of proper location of the waveguide 124 in two of the three dimensions. As discussed above, the edge 156 of each respective engaging pin 148 contacts the base 46 of the hub baseplate 40 to support and retain the second BUC assembly 44 to the hub baseplate 40. Thus, the technician's hands are free to initially tighten the fasteners 158, and then can use a screwdriver, nut driver, bolt driver or any other suitable type of tool to further tighten the fasteners 158 into their respective openings 54. Furthermore, the notch 76 in the stop/guide bar 68 that is connected to the first wall 48 of the hub baseplate 40 engages with the notch 134 of the first wall 134 of the carrier chassis 130 of the second BUC assembly 44 as discussed above.

Similarly, when installing a first BUC assembly 42 in the antenna dish assembly 16, the technician can rotate the antenna dish assembly 16 so that the yoke arm A closest to the first BUC assembly 42 is in the lower position and extends horizontally or substantially horizontally with respect to the horizon as understood in the art. The technician can rest the first BUC assembly 42 on a yoke arm A of the antenna dish assembly 16 before attempting to secure the first BUC assembly 42 to the hub baseplate 40. As understood in the art, the technician can rotate the antenna dish assembly 16 so that the yoke arm A closest to the first BUC assembly 42 is in the lower position and extends horizontally or substantially horizontally with respect to the horizon. In this example, the first BUC assembly 42 is lifted at or about 1.17 inches above the yoke arm A before being slid into engagement with the hub baseplate 40. However, the lifting distance can be any suitable distance to accommodate the dimensions of the antenna dish assembly 16, the antenna module mounting system 38 and so on. To secure the first BUC assembly 42 to the hub baseplate 40, the technician can align the first BUC assembly 42 with the hub baseplate 40 and move the first BUC assembly 44 in a direction similar to that of arrow "install" in FIGS. 87 and 88 so that the engaging pins 108 are positioned within the wider alignment portion 60 of their respective elongated openings 58 in a manner similar to that as shown, for example, in FIGS. 83-85.

The technician can then move the first BUC assembly 42 in the direction similar to that indicated by the arrows in the "install" direction as shown, for example, in FIGS. 83-85. By doing this, each respective engaging pin 108 slides along its respective elongated opening 58 until the engaging pins 108 are positioned within the narrower retention portion of their respective elongated openings 58 as shown, for example, in FIGS. 4, 58 and 82. In doing so, the first BUC assembly 42 can be within at or about 0.02 inches, or any suitable distance, of proper location of the waveguide 84 in two of the three dimensions. As discussed above, the edge 116 of each respective engaging pin 108 contacts the base 46 of the hub baseplate 40 to support and retain the first BUC assembly 42 to the hub baseplate 40. Thus, the technician's hands are free to initially tighten the fasteners 118, and can then use a screwdriver, nut driver, bolt driver or any other suitable type of tool to further tighten the fasteners 118 into their respective openings 54. Furthermore, the notch 76 in the stop/guide bar 68 that is connected to the second wall 50 of the hub baseplate 40 engages with the notch 102 of the second wall 96 of the carrier chassis 90 of the first BUC assembly 42 as discussed above.

As can be appreciated from the description herein, the antenna module mounting system 38 according to the disclosed embodiments provides a tool-free initial securing of the first and second BUC assemblies 42 and 44 regardless of whether the antenna dish assembly 16 is positioned at azimuth or in horizontal parked conditions. Thus, the antenna module mounting system 38 reduces Mean Time to Repair or replace (MTTR) the first and second BUC assemblies 42 and 44. An optional portable lifting mechanism (not shown) that can be moved to different gateway antennas 10 can be used to allow for one-person lifting of heavy expensive objects. Also, when the first and second BUC assemblies 42 and 44 are installed with the antenna dish assembly 16 in a horizontal parked position, the yoke arm A of the antenna dish assembly 16 provides for support of first and second BUC assemblies 42 and 44 and reduced stress on the installer.

The hub baseplate 40 can be be aligned with the antenna feed 28 which can be aligned in the factory with the reflector (i.e., the reflective surface 30 of the antenna dish assembly 16) and the subreflector 34. The antenna module mounting system 38 also provides for both gross and fine alignment of the BUCs 80 and 120 (e.g., the amplifiers) in the carrier chassis 90 and 130 of the first and second BUC assemblies 42 and 44, respectively, to the antenna waveguides 84 and 124, respectively. The carrier chassis 90 and 130 are designed to provide for the waveguides 84 and 124 of all types of amplifiers to have the same or similar nominal location with respect to the carrier chassis 90 and 130 by providing several common locating points on the carrier chassis 90 and 130 as described herein. In addition, the common carrier chassis 90 and 130 allows for multiple BUC amplifier configurations, which allows for multiple sourcing of the amplifiers from different manufacturers while maintaining a common attachment methodology. The antenna module mounting system 38 further provides protection of the antenna waveguides 84 and 124 coming from the antenna feed 28 in the antenna feed hub 20 during installation of first and second BUC assemblies 42 and 44, therefore only requiring one connection and avoiding having to remove and reinstall portions of the waveguides 84 and 124. The carrier chassis 90 and 130 also provide for a common location for the waveguides 84 and 124 regardless of the amplifier installed.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. An antenna module installation system comprising:
  a baseplate configured to couple to an antenna dish assembly and comprising an antenna module mounting apparatus including an alignment portion and a retention portion; and
  a carrier chassis configured to retain an antenna module and comprising an engaging apparatus, while connecting the carrier chassis to the baseplate, the engaging apparatus engages the alignment portion to position the carrier chassis in a mounting alignment and moves from the alignment portion to the retention portion to retain the carrier chassis in engagement with the baseplate.

2. The antenna module installation system according to claim 1, further comprising
a stop/guide bar configured to impede movement of the carrier chassis in a direction transverse to a travel direction along which the carrier chassis travels while the engaging apparatus moves between the alignment portion and the retention portion.

3. The antenna module installation system according to claim 2, wherein
the baseplate defines a baseplate surface that extends along the travel direction; and
the stop/guide bar is configured to impede movement of the carrier chassis in a direction substantially perpendicular to the baseplate surface.

4. The antenna module installation system according to claim 2, wherein
the stop/guide bar is coupled to the baseplate.

5. The antenna module installation system according to claim 4, wherein
the baseplate defines a baseplate surface that extends along the travel direction, and comprises a wall extending from the baseplate surface in a direction transverse to the travel direction; and
the stop/guide bar is coupled to the wall.

6. The antenna module installation system according to claim 2, wherein
the carrier chassis includes a wall defining a wall notch; and
the stop/guide bar defines an alignment notch configured to engage with the wall notch to impede the movement of the carrier chassis.

7. The antenna module installation system according to claim 2, wherein
the stop/guide bar is configured to impede the movement of the carrier chassis in the transverse direction while the engaging apparatus is positioned within a section of the alignment portion closer to the retention portion, and the stop/guide bar is configured to permit the movement of the carrier chassis in the transverse direction while the engaging apparatus is position within another section of the alignment portion further from the retention portion.

8. The antenna module installation system according to claim 2, wherein
the stop/guide bar is positioned in relation to a waveguide of the antenna dish assembly to impede the movement of the carrier chassis in the transverse direction to prevent a portion of the antenna module retained in the carrier chassis from contacting the waveguide.

9. The antenna module installation system according to claim 1, wherein
the antenna module mounting apparatus includes an elongated opening having a length extending in the baseplate with the alignment portion having a first width transverse to the length and the retention portion having a second width transverse to the length and smaller than the first width; and
the engaging apparatus includes an engaging pin that is configured to engage with the elongated opening.

10. The antenna module installation system according to claim 9, wherein
the engaging pin has a wide portion having a width less than the first width and greater than the second width, such that when the engaging pin is positioned in the retention portion, the baseplate contacts the wide portion to retain the carrier chassis in engagement with the baseplate.

11. The antenna module installation system according to claim 1, wherein
the carrier chassis further comprises a fastener that is separate from the engaging apparatus and configured to releaseably secure the carrier chassis to the baseplate while the retention portion which retains the carrier chassis in engagement with the baseplate.

12. The antenna module installation system according to claim 1, wherein
the antenna module includes an antenna hub amplifier, and the carrier chassis is configured to retain the antenna hub amplifier.

13. The antenna module installation system according to claim 1, further comprising
a waveguide protection guide plate configured to cover a portion of a waveguide that is configured to couple to the antenna module retained in the carrier chassis.

14. The antenna module installation system according to claim 1, wherein
the carrier chassis further comprises a cross bar assembly which extends over the antenna module retained in the carrier chassis.

15. The antenna module installation system according to claim 1, wherein
the carrier chassis is configured to retain another antenna module, different from the antenna module, in place of the antenna module.

16. The antenna module installation system according to claim 1, further comprising
a stop/guide bar configured to maintain the engaging apparatus at a depth of engagement with the alignment portion while the engaging apparatus moves from the alignment portion to the retention portion.

17. An antenna module installation system comprising:
a baseplate, configured to couple to an antenna dish assembly, and comprising a stop/guide bar and a surface defining an antenna module mounting apparatus; and
a carrier chassis configured to retain an antenna module and comprising an engaging apparatus, while connecting the carrier chassis to the baseplate, the engaging apparatus engages the antenna module mounting apparatus;
the stop/guide bar being configured to impede movement of the carrier chassis in a direction transverse to the surface of the baseplate while the engaging apparatus is engaged with a first portion of the antenna module mounting apparatus.

18. The antenna module installation system according to claim 17, wherein
the stop/guide bar is configured to permit the movement of the carrier chassis in the direction transverse to the surface of the baseplate while the engaging apparatus is engaged with a second portion of the antenna module mounting apparatus.

19. An antenna module installation method comprising:
providing a baseplate at an antenna dish assembly, the baseplate comprising an antenna module mounting apparatus including an alignment portion and a retention portion; and
installing a carrier chassis that retains an antenna module and comprises an engaging apparatus into the antenna dish assembly by positioning the carrier chassis such that the engaging apparatus engages with the alignment portion, while connecting the carrier chassis to the baseplate, which positions the carrier chassis in a mounting alignment, and moving the carrier chassis such that the engaging apparatus moves from the alignment portion to the retention portion which retains the carrier chassis in engagement with the baseplate.

20. The antenna module installation method according to claim 19, wherein the carrier chassis further comprises a fastener that is separate from the engaging apparatus; and the installing further comprises operating the fastener by hand to releaseably secure the carrier chassis to the baseplate by hand while the retention portion retains the carrier chassis in engagement with the baseplate, and further operating the fastener with a tool to further secure the carrier chassis to the baseplate.

\* \* \* \* \*